US006351287B1

United States Patent
Sakaegi et al.

(10) Patent No.: US 6,351,287 B1
(45) Date of Patent: Feb. 26, 2002

(54) APPARATUS FOR RECORDING, REPRODUCING OR ERASING

(75) Inventors: Yuji Sakaegi, Kawasaki; Shigeo Yamagata, Yokohama, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/256,224

(22) Filed: Feb. 24, 1999

Related U.S. Application Data

(62) Division of application No. 08/479,386, filed on Jun. 7, 1995, now Pat. No. 6,052,510, which is a continuation of application No. 08/112,218, filed on Aug. 26, 1993, which is a continuation of application No. 07/979,458, filed on Nov. 20, 1992, which is a continuation of application No. 07/408,213, filed on Sep. 18, 1989.

(30) Foreign Application Priority Data

| Sep. 19, 1988 | (JP) | 63-234154 |
| Sep. 19, 1988 | (JP) | 63-234156 |
| Sep. 19, 1988 | (JP) | 63-234157 |
| Sep. 19, 1988 | (JP) | 63-234158 |

(51) Int. Cl.[7] .............................................. H04N 5/225
(52) U.S. Cl. ........................ 348/372; 369/59; 369/116
(58) Field of Search ........................ 348/372; 396/277, 396/278, 279, 301, 302; 713/340; 714/14, 22; 369/59, 116

(56) References Cited

U.S. PATENT DOCUMENTS

| 3,614,309 A | 10/1971 | Presti | 360/35.1 |
| 3,723,668 A | 3/1973 | Ritchey, Jr. | 360/66 |
| 3,911,477 A | 10/1975 | Lackner | 358/4 |
| 4,558,380 A | 12/1985 | Porter | 360/53 |
| 4,636,905 A | * 1/1987 | Morimoto et al. | 360/137 |
| 4,796,250 A | * 1/1989 | Kobayashi et al. | 369/54 |
| 4,829,388 A | 5/1989 | Nakayama | 360/35.1 |
| 4,858,219 A | * 8/1989 | Yoshikawa | 369/116 |
| 4,862,290 A | * 8/1989 | Jung et al. | 386/120 |
| 4,939,717 A | * 7/1990 | Ohno et al. | 369/116 |
| 4,943,867 A | 7/1990 | Suetaka | 360/35.1 |
| 4,996,610 A | 2/1991 | Yunoki | 360/61 |
| 5,005,164 A | * 4/1991 | Sakamoto et al. | 369/116 |
| 5,016,124 A | * 5/1991 | Fukushima et al. | 369/243 |
| 5,123,007 A | * 6/1992 | Miyauchi et al. | 369/116 |
| 5,276,670 A | * 1/1994 | Nogami et al. | 369/116 |
| 5,404,348 A | * 4/1995 | Terao et al. | 369/116 |

* cited by examiner

Primary Examiner—Wendy R. Garber
Assistant Examiner—Mitchell White
(74) Attorney, Agent, or Firm—Fitzpatrick, Cella, Harper & Scinto

(57) ABSTRACT

In a recording or reproducing apparatus that performs an operation in a recording, reproduction, or erasing mode with respect to each memory block in memory, a check level for the apparatus power supply is changed according to a set one of the recording, reproducing, and erasing modes. The reproduction mode check level is higher than the recording mode check level to enable a later operation in the recording mode. A warning is displayed according to the check level while the operation in the reproduction mode is being performed.

8 Claims, 22 Drawing Sheets

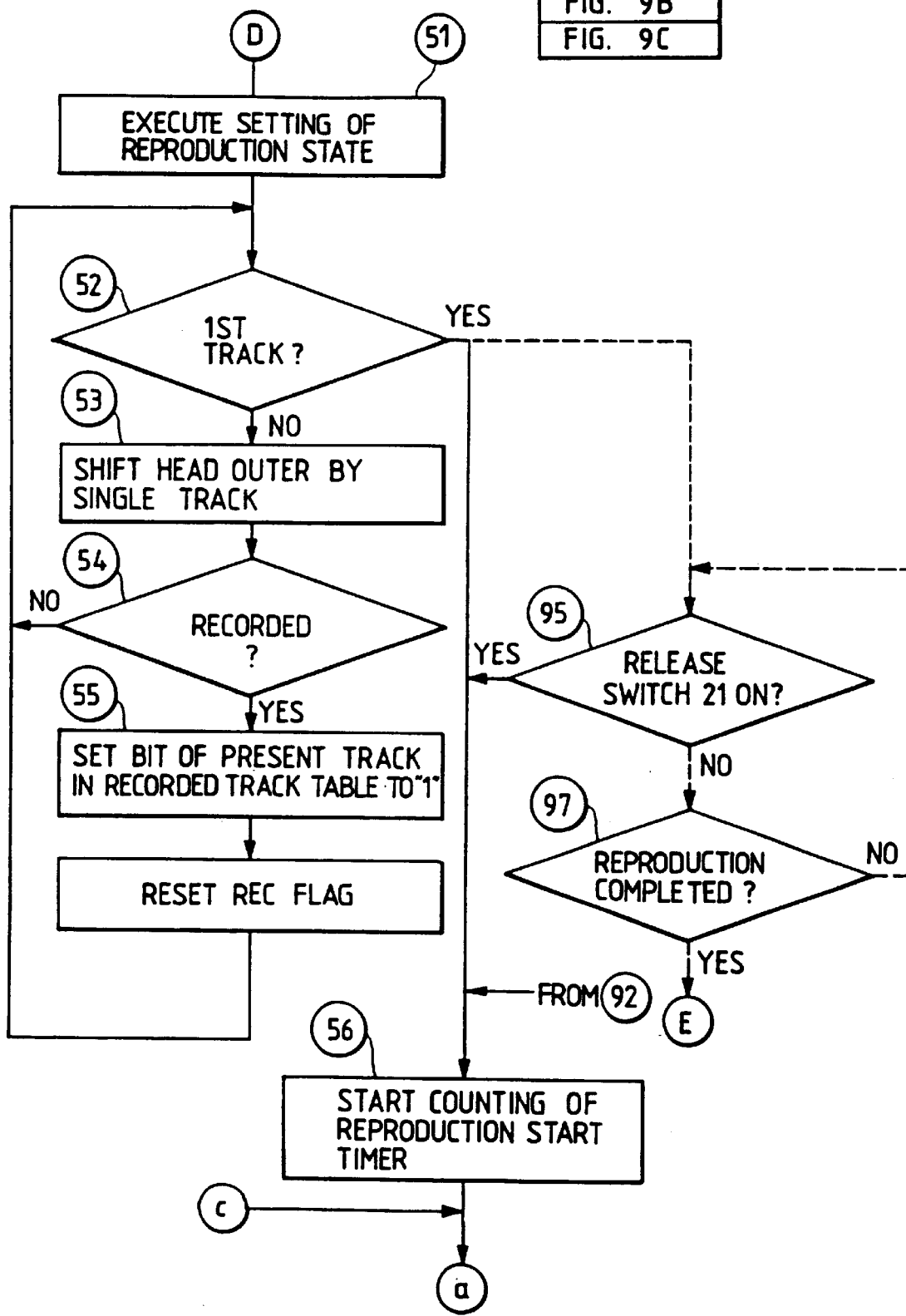

(BLINK TWO TIMES)

(ONE IMAGE
SURFACE RECORDING)

(SERIAL
RECORDING)

(SELF-TIMER
RECORDING)

APPARATUS FOR RECORDING, REPRODUCING OR ERASING

The present application is a divisional application of U.S. application Ser. No. 08/479,386, filed Jun. 7, 1995, (now U.S. Pat. No. 6,052,510), which is a continuation of U.S. application Ser. No. 08/112,218 filed Aug. 26, 1993, which is a continuation of U.S. application Ser. No. 07/979,458 filed Nov. 20, 1992, which is a continuation of U.S. application Ser. No. 07/408,213 filed Sep. 18, 1989.

BACKGROUND OF THE INVENTION

1. Field of the Invention

This invention relates to an apparatus for recording, reproduction and erasing.

2. Related Background Art

Heretofore, as an electronic still camera or like still video recorder, there is known a system, in which when a video floppy as a recording medium is loaded, all tracks on the disk are checked as to whether they are recorded tracks, the resulting data of the check is all stored, and the head is shifted to a track next to the last recorded track to be ready for operation. There is also known a system, in which when a disk is located, tracks thereon are retrieved outwardly, i.e., in the opposite direction to the frame feeding at the time of recording, to find out recorded tracks, and the head is shifted to a position corresponding to a track next to a recorded track that is found for the first time.

In the former system, when it is desired to shift the head either forwardly or reversely to change the accessed track, with which to start recording, a quick response can be obtained without the need of operating a FWD or REV switch for the status of all tracks as to whether they are recorded tracks is memorized in a controller. On the demerit sides, considerable time and power consumption are necessary from the instant of loading of disk till it is ready to start recording. The latter system, on the other hand, dispenses with a memory for storing data as to whether tracks are recorded or not, and in many cases it is impossible to designate a desired track.

While a still video recorder is taken above as an example of recorder to facilitate understanding, the problems discussed above are also encountered in various other recorders as well as still video recorder.

Further, various systems are known, in which a recording or reproduction is brought about by changing the memory blocks of a memory having a plurality of memory blocks.

In such a system, as a means for instructing a change in a memory block, with which to start recording or reproduction, the individual memory blocks are given respective addresses, and UP and DOWN switches for address updating in the increasing and decreasing directions, respectively, are provided. Thus, in either recording or reproduction, the memory block, with which to start recording or reproduction, can be changed freely by using the UP and DOWN switches.

However, a system, in which a recording function is mainly used, for instance a still video camera which has recording and reproduction functions, often is constructed such that recording is performed while searching non-recorded memory blocks for generally automatic recording. Therefore, the ability of readily changing the memory block with which to start recording by the UP and DOWN switches noted above is sometimes rather inconvenient.

Further, there are known various systems with an erasing function, i.e., a function of erasing data recorded in tracks formed on a recording medium.

However, where such a system having an erasing function is a small size apparatus such as one which deals with a small medium called still video floppy, since a reproduction or recording function is necessary in addition to the erasing function, it is difficult to incorporate these functions while improving the operation control property.

Heretofore, in portable electronic apparatuses, it is very important that power can be supplied from a battery. Particularly, for video tape recorders and electronic cameras which are being spread quickly in recent years, size and weight reduction and battery driving are essential requirements in view of the outdoor recording. Further, where there are commercial power supply cables (referred to as an AC power source), an AC power source may also be used to permit long-time reproduction and editing of video-data obtained by long-time recording.

Further, with such a video apparatus, an erasing mode is necessary for re-using recorded tracks which become unnecessary, by erasing data on these recorded tracks. These modes may be provided depending on the purpose of apparatus. However, power consumption varies with the provided modes, and therefore it is necessary to consider power supply voltage for each provided mode.

Where a battery is used as a power supply, however, it is of course necessary to take the battery duration into considerations at all time. If the battery is worn out during recording or reproduction, the recording operation becomes impossible. In such a case, a change of recording may sometimes be lost. For this reason, it is necessary to measure for minimizing the wear of battery during use thereof. Merely increasing the battery capacity, however, increases the size and weight of the battery. This will dictate sacrifice in the size and weight reduction, which is a feature of the portable apparatuses.

Further, in case of a system having an erasing function, greater power is consumed in the erasing mode than in the recording and reproduction modes. Where a battery is used as a power supply, it is liable that the capacity of the power supply is reduced during the erasing operation to such an extent that the recording and reproduction are impossible. In such a case, a change of recording is again liable to be lost.

Further, unlike the recording operation, the reproduction is performed by molding constant power consumption. Therefore, it is again liable that the power supply capacity is reduced through the reproducing operation to such an extent that recording is no longer possible.

SUMMARY OF THE INVENTION

A primary object of the invention is to provide a novel system, which can solve all or at least one of the problems discussed above.

Another object of the invention is to provide a recorder, which permits quick accessing to a non-recorded area of a recording medium.

A further object of the invention is to provide a recorder, which permits great saving of power as well as quick accessing to a non-recorded area of a recording medium.

To attain the above objects of the invention, there is provided a recorder, in which recording is effected while retrieving non-recorded blocks of memory means, and which is provided with means for such control that when no non-recorded block is detected in a predetermined direction, as a result of a check performed in response to an instruction for changing the block, with which to effect recording, in the afore-said predetermined direction, previously accessed non-recorded blocks are accessed again.

A further object of the invention is to provide a recording or reproducing apparatus, which can be used conveniently either in a recording mode or in a reproduction mode.

A further object of the invention is to provide a recorder, in which a memory block with which to effect recording is never changed occasionally.

To attain the above objects, there is provided a recording or reproducing apparatus, which comprises a setting means for setting a change in a memory block in a recording mode and also in a reproduction mode and a control means for permitting said setting means to set a memory block change differently in the recording mode and in the reproduction mode.

A further object of the invention is to provide an erasing apparatus, which is simple in construction and has satisfactory operation control property although it is a multi-function apparatus.

A further object of the invention is to provide an erasing apparatus, which permits the ready setting of a reproduction mode and an erasing mode.

A further object of the invention is to provide an apparatus, which is capable of setting at least two modes along recording, reproduction and erasing modes and can ensure reliable operation in each of these modes.

A further object of the invention is to provide a recording or reproducing apparatus, which can ensure reliable operation in various modes and permits the effective utilization of a power source.

The above and other objects, features and advantages of the invention will become more apparent from the following description of preferred embodiments and accompanying drawings.

BRIEF DESCRIPTION OF THE DRAWINGS

FIGS. 6-1, 6-2 and 7 to 9 are flow charts for explaining the operation of the same embodiment;

DESCRIPTION OF THE PREFERRED EMBODIMENT

A following embodiment of the invention concerns a still video recorder, in which concentric circular tracks are formed on a disk. However, such a still video recorder is by no means limitative, and it is possible to use a card-like or tape-like memory means as well as disk-like one.

Now, the embodiment of the invention will be described with reference to the drawings.

Figure 1:
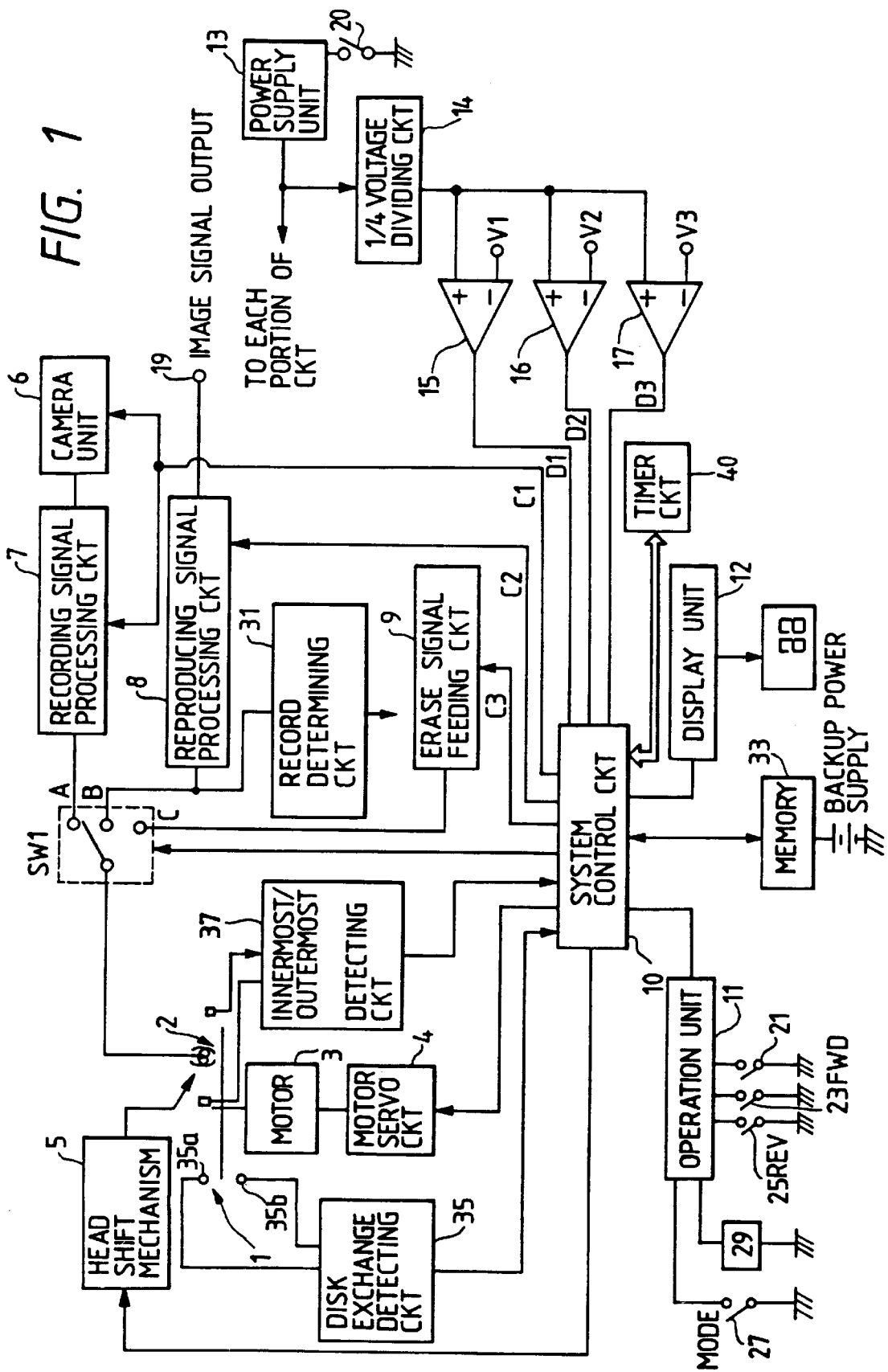
FIG. 1 is a schematic representation of an embodiment of the invention.

FIG. 1 is a block diagram showing an embodiment of the construction. Referring to FIG. 1, reference numeral 1 designates a magnetic disk as recording medium, and 2 a magnetic head capable of being displaced in the radial direction of the rotating magnetic disk 1 for recording, reproducing and erasing signal on tracks formed on the disk 1. The disk 1 is rotated by a motor 3. The motor 3 is controlled by a motor servo circuit 4 to rotate the disk 1 at a constant speed. The magnetic head 2 can be displaced by a head shift mechanism 5 in the radial direction of the disk 1 to a position corresponding to one of concentric tracks formed on the disk 1. Reference numeral 6 designates a camera unit, which includes an optical system having a recording lens, a stop shutter and a recording element for converting recorded image data obtained by the optical system into electric signals. A recording signal processing circuit 7 performs a processing such as frequency modulation on the electric signal from the camera unit to obtain a signal suited for recording on the magnetic disk. The signal from the circuit 7 is supplied through a switch SW1 to the magnetic head 2. A reproducing signal processing circuit 8 receives signals reproduced from tracks on the disk 1 by the head 2 and supplied through a switch SW1, and it performs a processing such as frequency demodulation on the received signal to recover the original video signal supplied to a video signal output terminal. An erase signal feeding circuit 9 provides an erase signal for supplying an erase current to the head 2 through the switch SW1. Reference numeral 10 designates a system control circuit for controlling the recorder, i.e., the servo motor circuit 4, head shift mechanism 5, camera unit 6, recording signal processing circuit 7, reproducing signal processing circuit 8, erase signal feeding circuit 9, switch SW1, etc. An operation unit 11 provides commands corresponding to various modes to the system control circuit 10, and it has various switches including a release switch 21, a FWD switch 23, a REV switch 25 and a mode switch 27 to be described later. A display unit 12 displays information concerning various modes under control by the system control circuit 10, and it has a two-digit seven-segment display. A power supply unit 13 supplies power to the recorder, i.e., to various components thereof. A power switch 20 switches power supply from the power supply unit 13 to various recorder components. A ¼ voltage dividing circuit 14 divides the voltage from the power supply unit 13 to ¼. Voltage comparators 15 to 17 receive a signal from the ¼ voltage dividing circuit 14 at their plus terminal and receive respective preset voltage V1 to V3 at their minus terminal, and their output signals are supplied to the system control circuit 10. The video signal obtained from the reproducing signal processing circuit 8 is supplied to the outside through a terminal 19. The release switch 21 is for causing the recording of an image, the REV switch 23 is for instructing an outward shift of the head 2, the FWD switch 25 is for instructing an inward shift of the head 2, and the mode switch 27 is for setting various modes in a preset recording mode. A switch 29 is for setting a recording mode, an erase mode, a reproducing mode and a lock mode. When the lock mode is set, the power switch 20 is turned off to disconnect the power supply from the recorder. A record determining circuit 31 determines from the output of the head 2 that there is or is not any record in a track being accessed by the head 2. A memory 33 stores the output of the system control circuit 10, for instance the result of the check as to whether there is any record in each track and the ordinal number of the track being accessed by the head 2. A disk exchange detecting circuit 35 detects exchange of disks with photo-couplers 35*a* and 35*b*. An innermost/outermost track detecting circuit 37 detects the reaching of the innermost or outermost track by the head 2. A timer circuit 40 detects time the of operation of the recorder, and its clear-and count start timings are controlled according to the output of the system control circuit 10.

Now, the appearance of this embodiment of a recorder will be described with reference to FIGS. 2 to 5.

Figure 2:
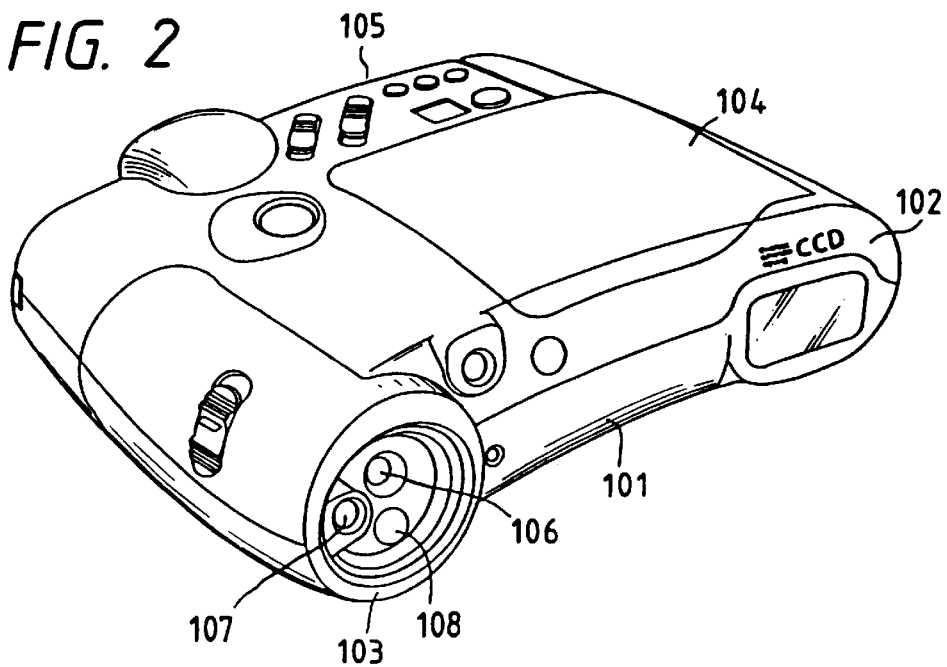
FIG. 2 is a perspective view showing the same embodiment.
Figure 3:
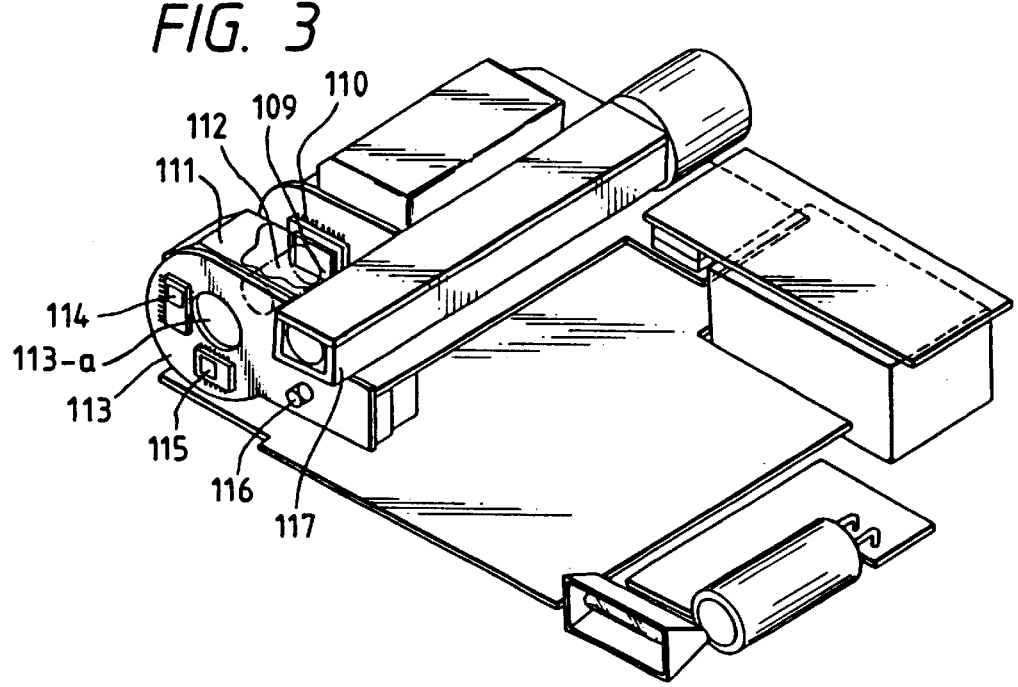
FIG. 3 is a perspective view showing the same embodiment with outer members removed.
Figure 4:
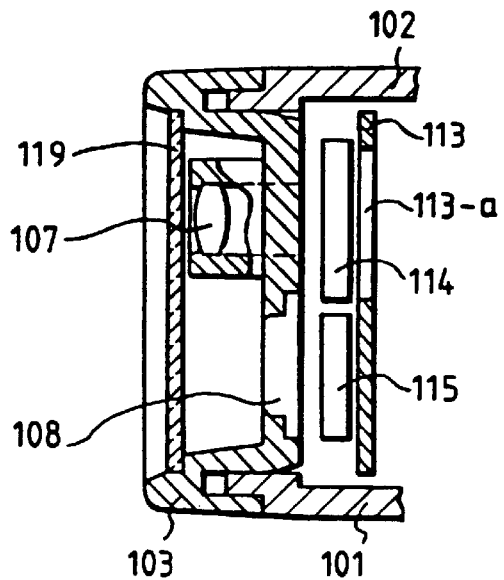
FIG. 4 is a sectional view showing an optical system of the same embodiment.
Figure 5:
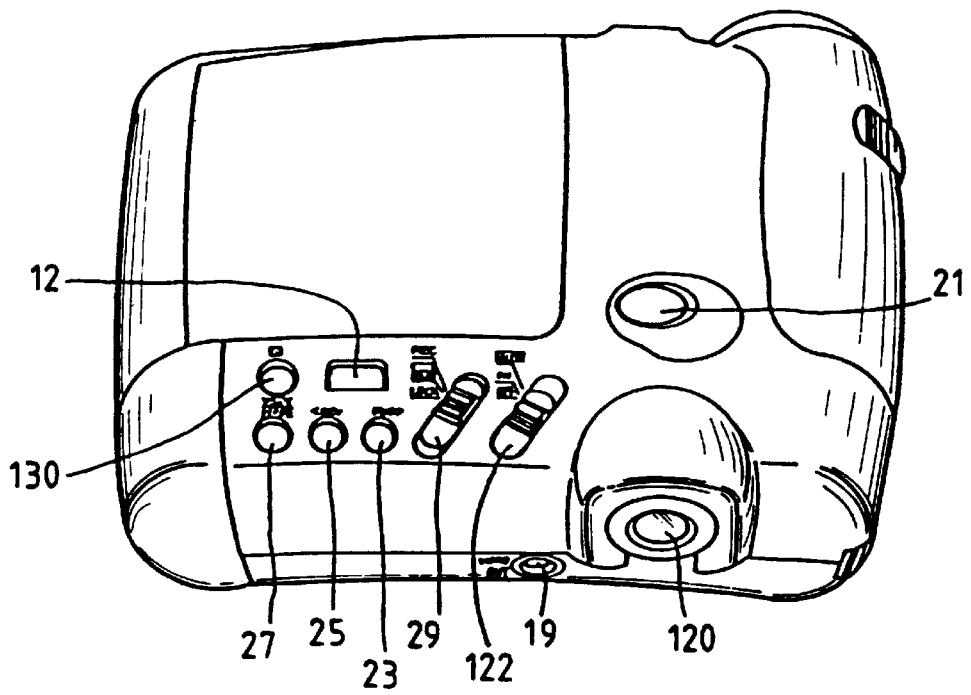
FIG. 5 is a rear perspective view showing the same embodiment.

FIG. 2 is a perspective view (from right front) showing the embodiment of recorder, FIG. 3 is a perspective view (from left front) showing the recorder of FIG. 2 with covering removed, FIG. 4 is a sectional view showing an optical system, and FIG. 5 is a perspective view (from rear) showing the recorder of FIG. 2.

The outer members of the still video recorder shown in FIG. 2 are mainly an upper cover 102, a lower cover 101, a lid 104 as a lid member of a video floppy loader as a disk used for this embodiment and a protective cover 103 mounted such as to cover the front side of various optical systems.

In FIG. 3, showing the recorder with the outer members removed, a shutter unit 111 accommodating a recording lens unit 112 is disposed in front of a base member 110, to which a recording element 109 is soldered. In front of the shutter unit 111, a printed circuit board 113 with a light measurement IC 114 and a color measurement sensor 115, both secured to it, is secured to the shutter unit.

The board 113 has an escapement hole 113-*a* for the recording optical system, and a display LED 116 is mounted on the board 113 for being turned on at the time of self-timer recording.

The various outer members noted above are mounted on the recorder block having the above construction, and the protective cover 103 is mounted from the front as shown in FIG. 2.

FIG. 4 is a sectional view showing the protective cover 103, a light measurement condenser lens 107 and a color measurement diffuser 108 mounted on the protective cover 103 such that they face the light measurement IC 114 and the color measurement sensor 115 mounted on the printed circuit board 113, respectively.

On the front side of these components, a protective glass member 119 is secured to the protective cover 103.

The various switches described before in connection with FIG. 1 are arranged as shown in FIG. 5. Referring to FIG. 5, reference numeral 120 designates a viewfinder for observing an object which is recorded by the optical recording system, 122 a strobe recording mode setting switch, and 130 an exposure correction switch.

In this embodiment, a thin structure of electronic camera as shown in FIG. 5 can be provided for convenient use.

Now, the operation of the embodiment having the above construction will be explained.

Figures 1, 6:
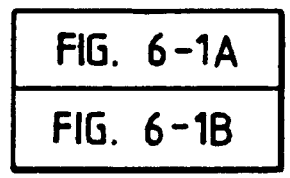
Figures 1A, 6:
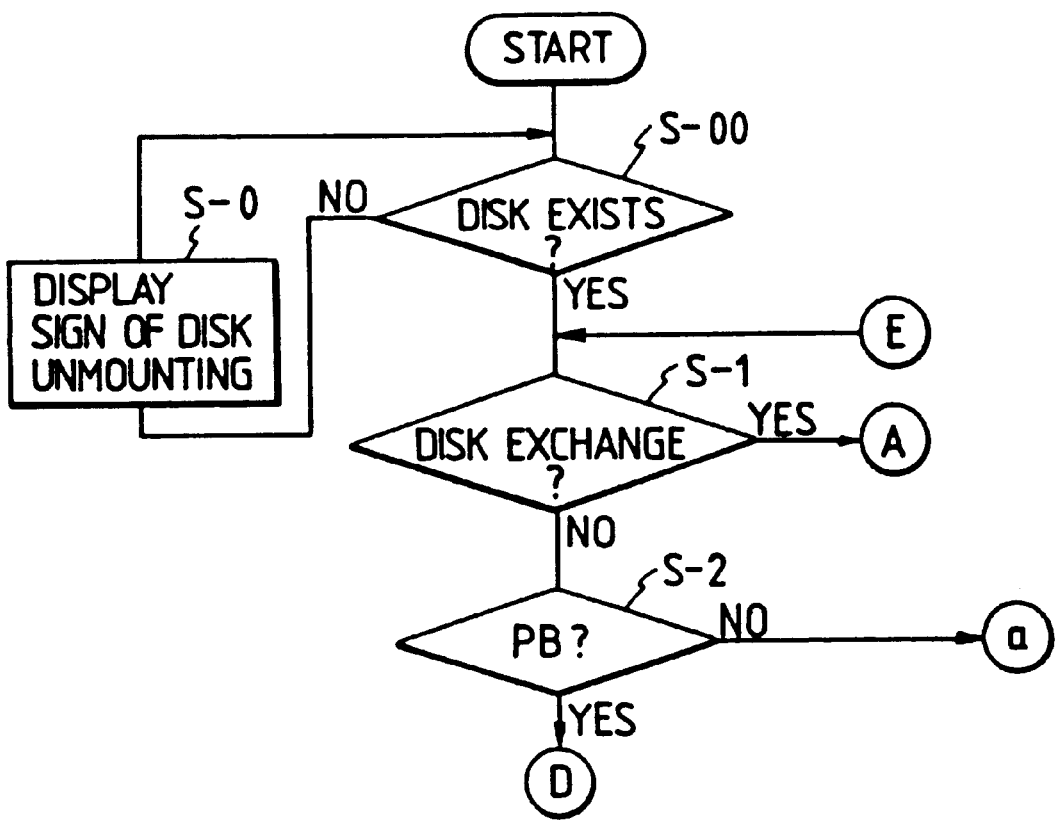
Figures 1B, 6:
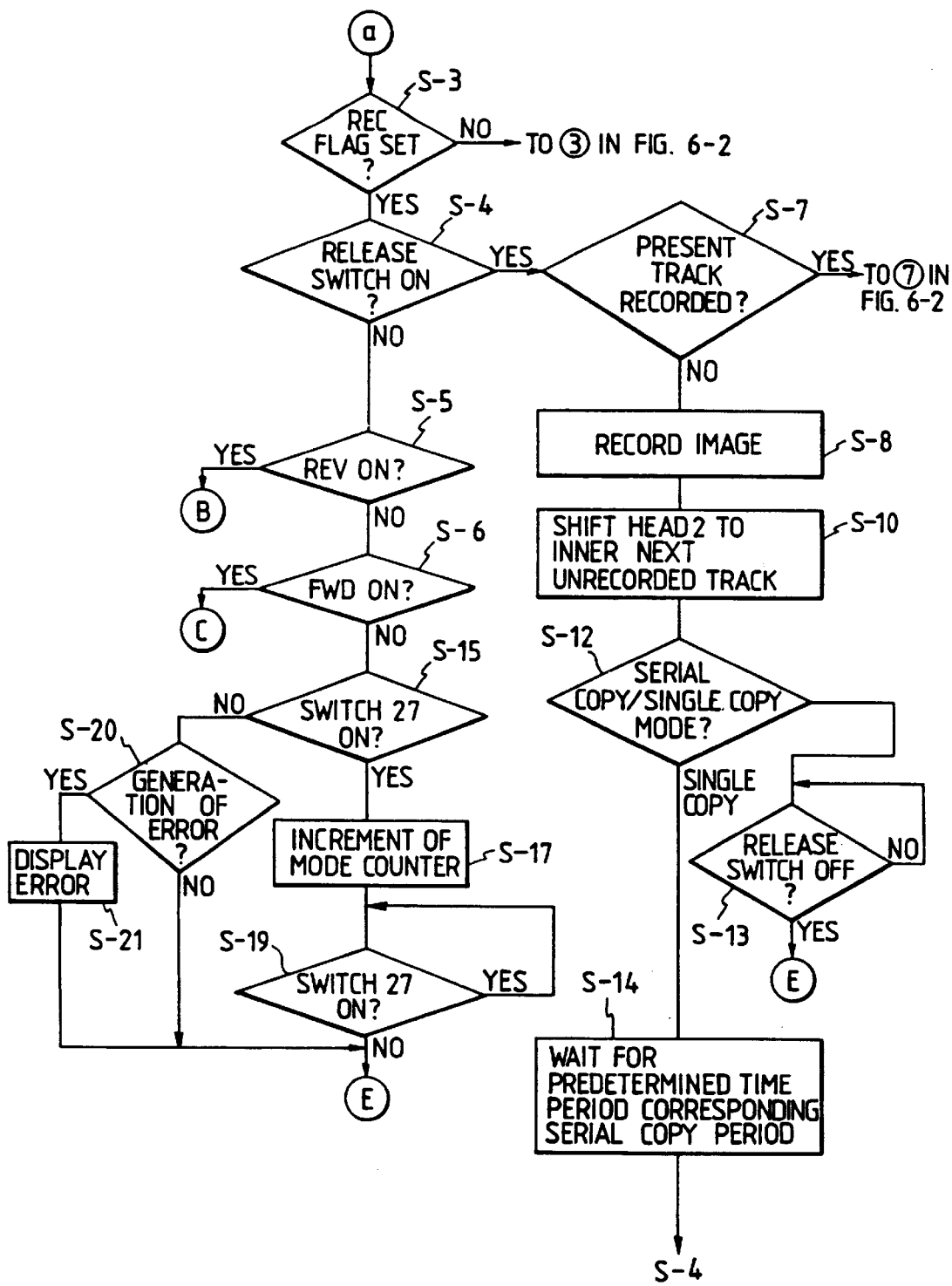
Figures 2, 6:
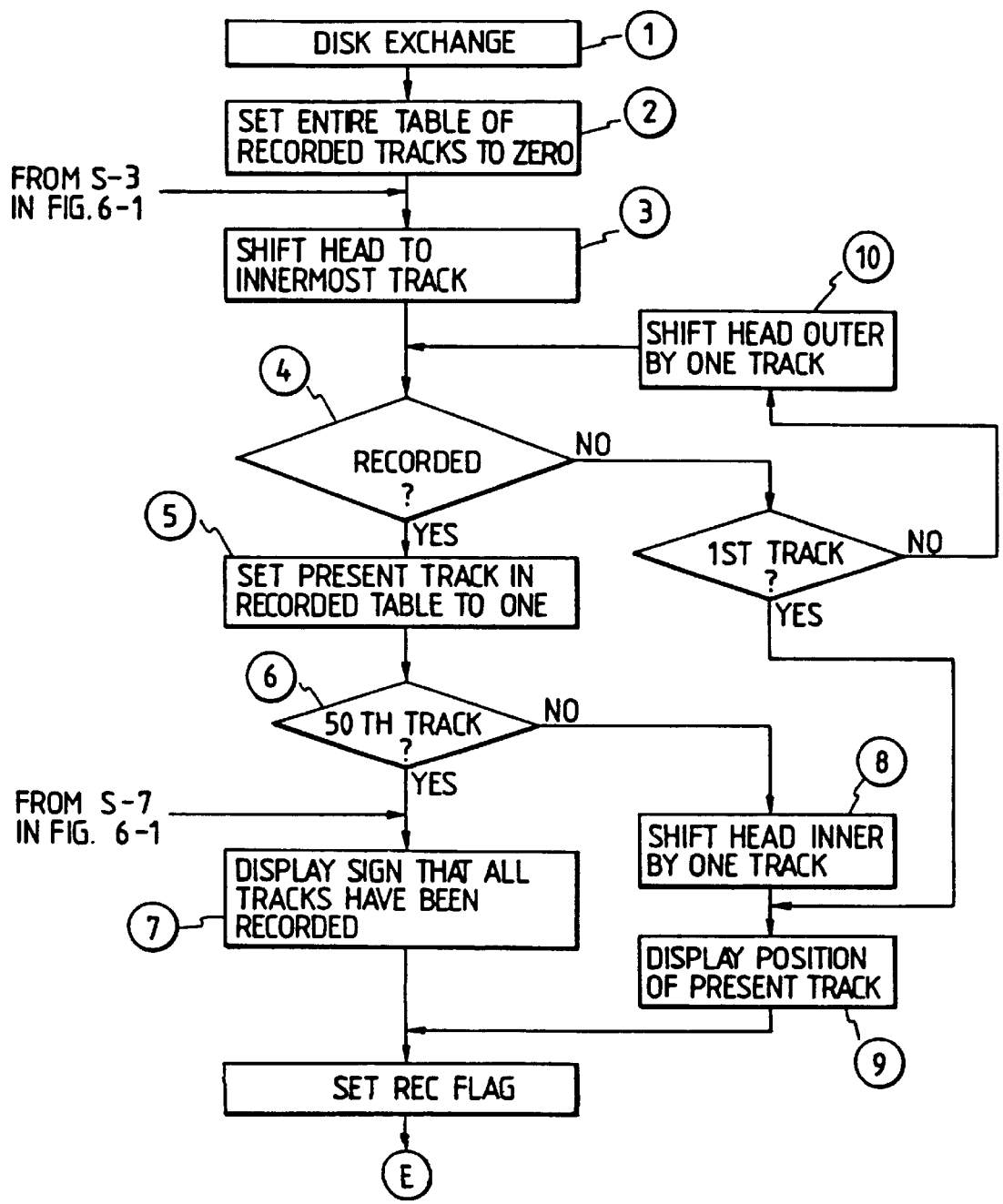
Figure 9B:
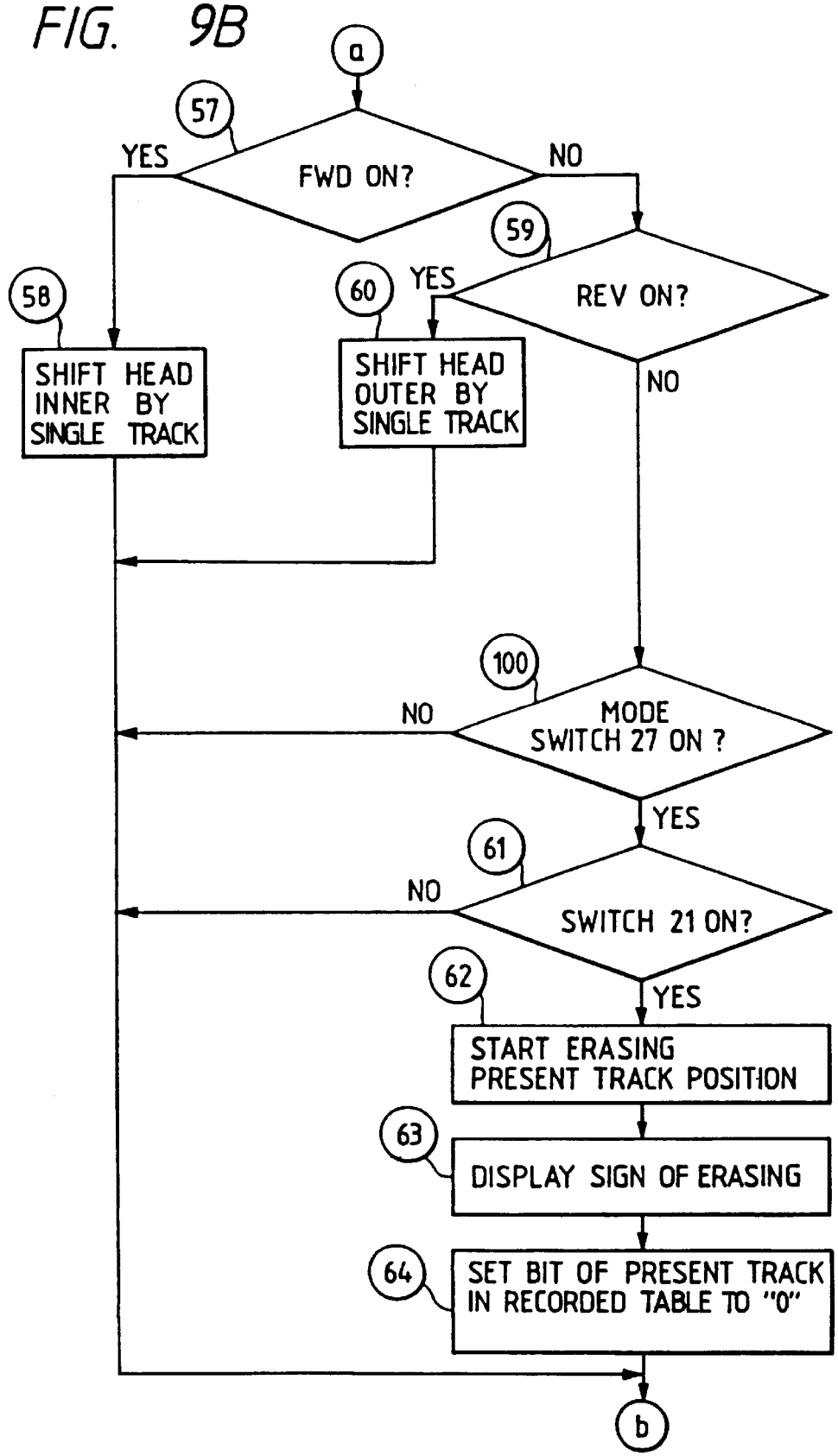
Figure 9C:
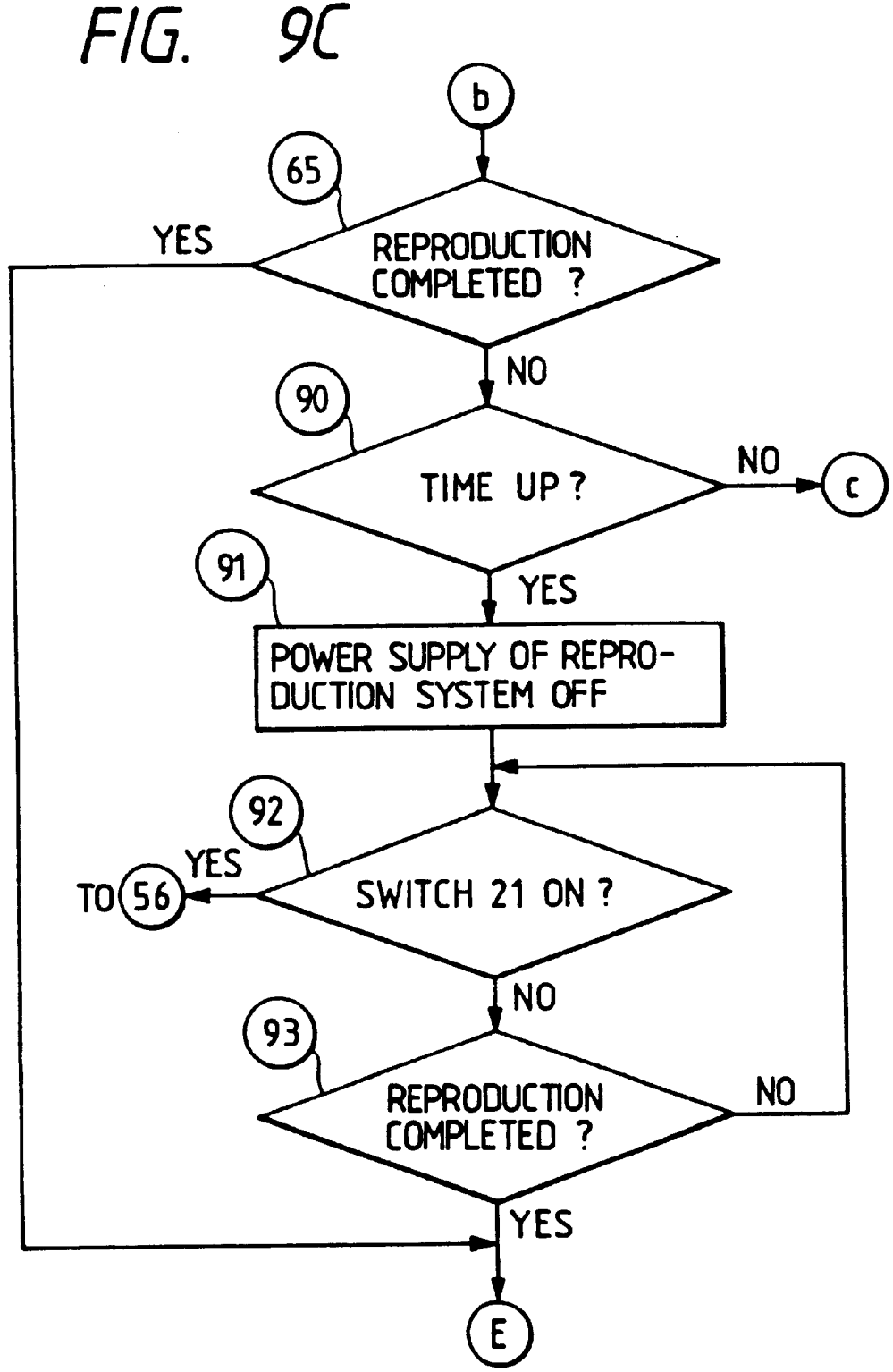

FIGS. 6-1 to 9 are flow charts for explaining the operation of this embodiment.

FIG. 6-1 shows the overall flow of operation of the embodiment.

This flow is executed by releasing the lock of the switch 29 shown in FIG. 5.

Figure 10A:
FIGS. 10A to 10H are views showing examples of display on display unit 12 shown in FIG. 1.
Figure 10B:
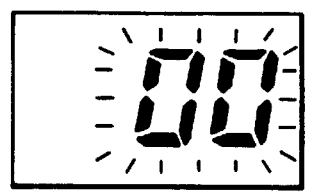

In FIG. 6-1, a step S-00 effects a check according to the outputs of the photo-couplers 35*a* and 35*b* as to whether there is any disk. If no disk is detected, a step S-0 effects blinking of a display "00 as shown in FIG. 10B on the display unit 12. If a disk is detected in the step S-00, a step S-1 effects a check as to whether a disk exchange is detected by the disk exchange detecting circuit 35. A step S-2 effects a check as to whether the reproducing or playback mode (PB mode) is set by the slide switch 29. A step S-3 effects a check as to whether a REC flag to be described later is set. A step S-4 effects a check as to whether the relay switch 21 is "on". If the relay switch is "on", the flow goes to a step S-7, otherwise it goes to a step S-5. The step S-5 effects a check as to whether the REV switch 25 is "on" without detection of the PB mode in the step S-2. A step S-6 effects a check as to whether and FWD switch 23 is "on". If the steps S-1, S-2, S-5 and S-6 provide "Yes", respective routines A, B, C and D are executed.

If the step S-6 determines that the FWD switch is not "on", a check is done as to whether the switch 27 is "on" (step S-15). If the switch 27 is found to be "on", a mode counter in the system control circuit 10 is incremented (step S-17).

In this embodiment, a serial recording mode, a one image surface recording mode and a self-timer recording mode can be set in the mentioned order by turning on the mode switch 27 shown in FIGS. 1 and 5 a corresponding number of times. When these modes are set, the display on the display unit 12 is switched as shown in FIGS. 10F, 10G and 10H. To permit reliable setting of the above modes, in this embodiment the system control circuit 10 includes an internal mode counter. Every time this counter is incremented, its count is updated cyclically such as "0"→4 "1"→"2"→"0 ".

The one surface image recording, serial recording and self-timer recording are set with a mode counter count of "0", "1" and "2", respectively. Subsequent to the step S-17, a check is done as to whether the switch 27 is "on" (step S-19), and eventually the flow returns to the routine E. If the switch 27 is not found to be "on" in the step S-15, a check is done as to whether there is any error in the recorder. If any trouble, for instance failure of the servo of the motor 3, is detected, a display as shown in FIG. 10B is effected.

If it is found in the step S-3 that the REC flag is set, the flow goes to a step S-4, and otherwise it goes to a step (3) shown in FIG. 6-2 to be described later.

If it is found in the step S-4 that the release switch is "on", a step S-7 effects a check as to whether the track accessed by the head is a recorded track. If the track is a recorded track, the flow goes to a step (7) in FIG. 6-2 to be described later for displaying that recording can no longer be made.

In the REC mode, the switches 25 and 23 are operated such that the head is normally accessing the innermost but one recorded track on the disk. This means that in this mode a normally a non-recorded track is set as the track accessed by the head.

Therefore, if such automatic setting can not be obtained, that is, a recorded track is automatically set as the accessed track, a display is produced to indicate that recording can no longer be made.

Unless it is found in the step S-7 that the accessed track is the recorded track, a step S-8 is executed, in which a signal from the camera unit 6 is supplied through processing circuit 7 to the head 2 for recording an image signal on the disk 1. Then, in a step S-10 the head 2 is shifted to the next inner vacant track on the disk 1, and a check is done, according to the count of the mode counter described earlier in connection with the step S-17, as to whether the present mode is the single or serial recording mode (step S-12). If the single recording mode is detected, a step S-13 effects a check as to whether the release switch is "off". If this is so, the flow returns to the routine E. If the serial recording mode is detected in the step S-12, a predetermined time period is provided, which corresponds to the period of serial recording (step S-14), before the flow returns to the step S-4.

Now, the routine A will be described with reference to FIG. 6-2.

If the disk exchange detecting circuit 35 detects a disk exchange in a step (1), the system control circuit 10 sets the entire table of recorded tracks (contained in the memory 33) to "0" and controls the head shift mechanism until the detecting circuit 37 detects the reaching of the innermost track by the head (steps (2) and (3)). Subsequently, the head 2 is shifted outwardly from the 50-track to access the successively tracks, while causing the check by the determining circuit 31 as to whether the accessed track is a recorded track. If the 50-track is a recorded track (step (6)), a message that "all tracks have been recorded" is displayed on the display unit 12 as two-digit seven-segment display. As an example of display, blinking of "50" may be caused as shown in FIG. 10A. Doing so permits the reduction of the number of display segments and also permits ready understanding of the message content. If the step (6) negates that the 50-th track is a recorded track, the head 2 is shifted inwardly by one track i.e., to a vacant track (step (8)), and the accessed track is numerically displayed (step (9)). If the step (4) negates that the accessed track is a recorded track, the head is outwardly shifted by one track (step (10)), and again the check in the step (4) is executed. In a step (5), "1" is set in a corresponding address of the table contained in the memory 23.

By executing the above flow, the head 2 is positioned to access the outermost one of the inner non-recorded tracks on the disk 1. If the 50-th track is a recorded track, a display as shown in FIG. 10A is produced as an alarm to the user.

By executing the above flow, a REC flag is set in a step (11), indicating that the head 2 is positioned on a non-recorded track for recording.

Figure 7:
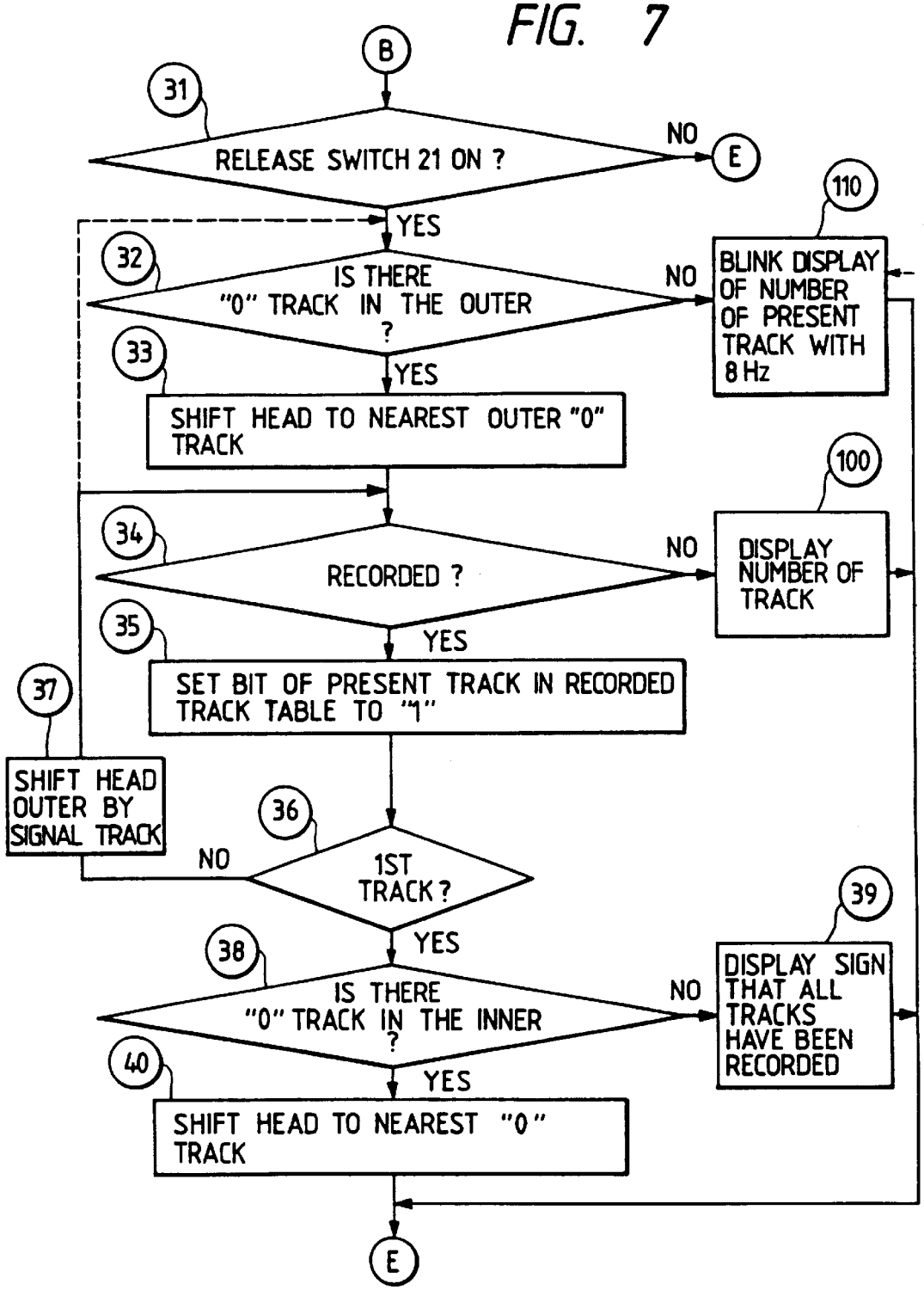

By depressing the release switch after the head is shifted to a non-recorded track in the flow of FIG. 6-1, the step S-8 of recording as shown in FIG. 6-1 is executed. FIG. 7 shows the routine B which is executed when the REV switch is depressed. Referring to FIG. 7, when the release switch 21 is turned on with the REV switch 25 in the "on" state, the recorder does nothing if there is no outer "0" track (step (32)). If there are outer "0" tracks, the head 2 is shifted to the nearest outer "0" track (step (33)). If it is found in a step (34) that this track is a non-recorded track, the ordinal number of this track is displayed on the display unit (step (100)). If the track is a recorded track, "1" is set in the present track bit in recorded track table (step (35)). Then, steps (34) through (37) are repeatedly executed until it is found in the step (36) that the present track is the 1-st track or until a non-recorded track is detected. If it is found that the entire tracks are recorded tracks with the 1-st track reached by the head 2 while the steps (34) to (37) are repeatedly executed, the routine goes to a step (38), in which track table in the memory 33 is retrieved to check if there is any inner "0" track. If there are inner "0" tracks, the head is shifted to the nearest "0" track in the track table (step (40)). Otherwise, a message that the entire tracks are recorded is displayed as shown in FIG. 10A. When shifting the head to the nearest "0" track in the track table, it is moved at a high speed.

While in this embodiment the step (34) is executed subsequent to the step (37), if the flow is adapted to go from the step (37) to the step (32) as shown by dashed line in FIG. 7, the determining circuit 31 need not effect a check in the step (34) as to whether there is any "1" recorded track in the track table, so that it is possible to reduce time required for shifting the head to a non-recorded track.

Now, the routine C executed in connection with the step S-4 shown in FIG. 6-1 will be described.

Figure 8:
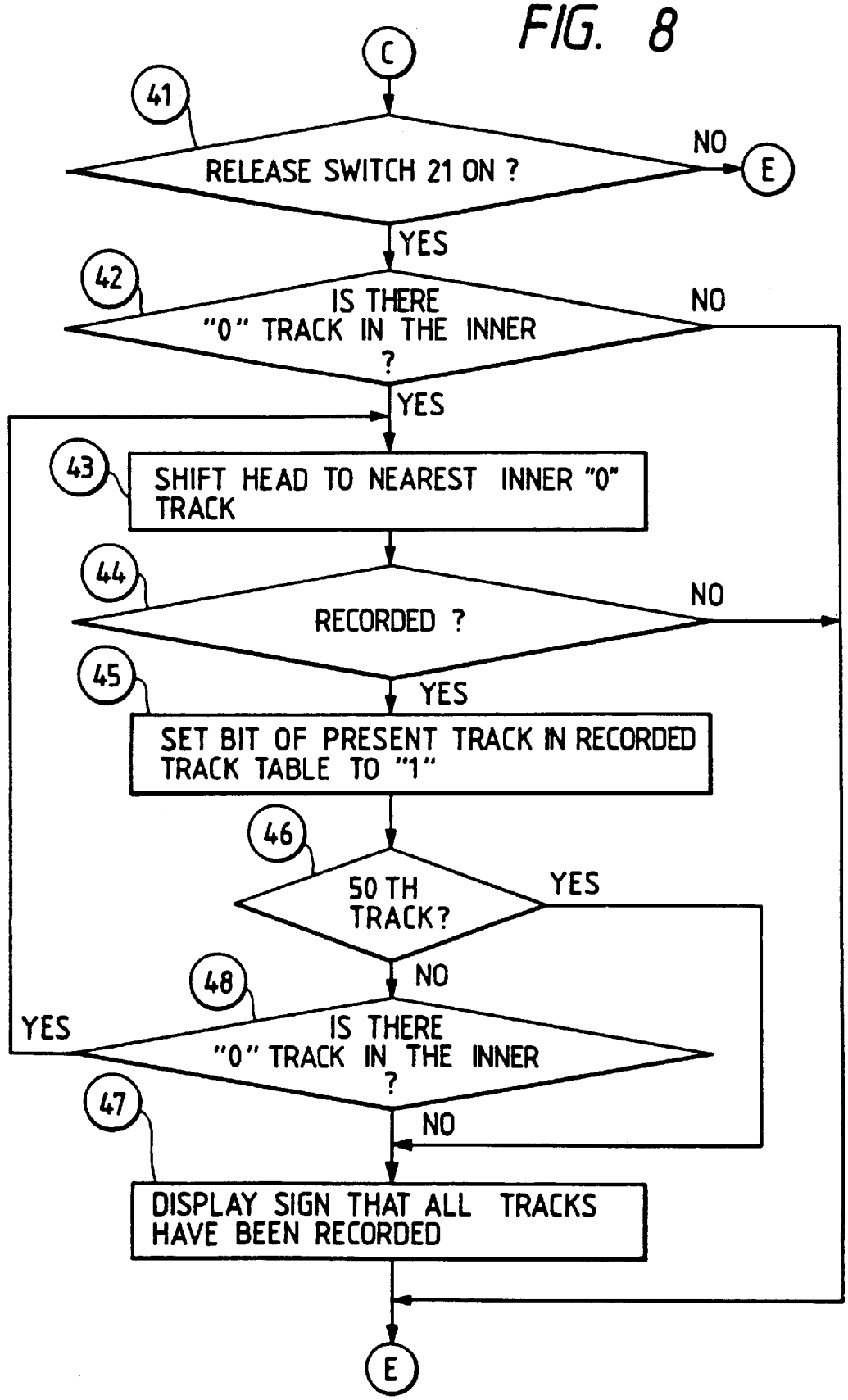

Referring to FIG. 8, when the release switch 21 is turned on with the FWD switch "on" (step (41)), a step (42) effects a check as to whether there is any inner "0" track with respect to the track being accessed by the head 2. If there is no such "0" track, nothing is done. If there are such "0" tracks, the head is shifted to the nearest inner "0" track (step (43)). Then in a step (44) the determining circuit 31 checks whether the accessed track is a recorded track. If the track is a non-recorded track, the flow goes to the routine E described before. If the track is a recorded track, "1" is set in the present track bit in recorded track table in the memory 33 (step (45)), and a check is done in a step (46) as to whether the present track is the 50-th track. If the track is the 50-th track, a message that all tracks have been recorded is displayed as shown in FIG. 10A (step (47)). If the track is not the 50-th track, a check as to whether there is any inner "0" track is done again by retrieving "1" tracks in the table in the memory 33. If there are such tracks, the flow goes to the step (43). Otherwise, an end is brought to the routine.

Now, the routine D executed when "Yes" is provided in the step S-2 shown in FIG. 6-1 will be described with reference to FIG. 9. This routine involves the functions of reproduction and erasing in the system.

First, in a step (51) a reproduction state is set. To this end, the switch SWi shown in FIG. 1 is switched to the B side. At this time, the ordinal number of track accessed by the head 2 may be displayed on the display unit 13.

More specifically, in the recording, when all the tracks on the disk 1 are recorded while executing the steps (4) through (10) shown in FIG. 6-2, a blinding display as shown in FIG. 10A is effected. In the step (51), however, such blinding display is stopped, and ordinary display is provided.

In a subsequent step (52), a check is done as to whether the present accessed track is the 1-st track. If the track is not the 1-st track, the head is outwardly shifted by one track (step (53)). Then in a step (54) a check is done from table in the memory 33 or from the output of the determining circuit 31 as to whether the track is a recorded track. If the check provides "Yes", "1" is set in the present track bit in the recorded track table (step (55)). This is not done if the track is a non-recorded track. Then, a check as to whether the head 2 is accessing the 1-st track is done again. The above sequence is repeated until the 1-st track is reached.

In this embodiment of a recorder, when disks are exchanged or a new disk is loaded, a check as to whether track is recorded or not is executed for successive tracks on the disk from the innermost one until a recorded track is detected, whereupon "1" is set in each address of table in the memory 33, as described before in connection with the flow of FIG. 6-2.

In the flow of steps (51) to (55.) in FIG. 9, a recorded track is checked for within the tracks from the accessed track to the 1-st track. Thus, in this embodiment, when the reproduction mode is set by the switch 29 after insertion of the disk 1 in the recorder, the data as to whether each of all the tracks on the disk 1 is a recorded track is written in the table in the memory 33. Thus, an operation when a next mode is set, for instance the shift of the head to a non-recorded track when the recording mode is set, can be quickly executed.

If 1-st track is detected in the step (53), the reproduction is started by switching the switch SW1 to the B side, and also the counting of a reproduction timer is started (step (56)). Then, if the FWD switch 23 is "on" (step (57)), the head 2 is inwardly shifted by one track (step (58)). If the REV switch 25 is "on" (step (59)), the head is outwardly shifted by one track (step (60)).

Figure 10C:
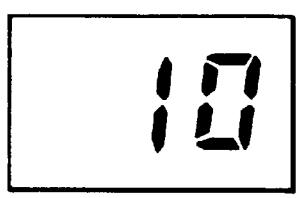
Figure 10D:
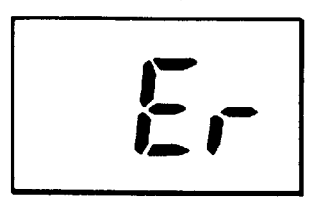

When the head 2 is shifted in the step (58) and also in the step (60), the present position of the head 2 is displayed as shown in FIG. 10C on the display unit 12.

Figure 10E:
Figure 10F:
Figure 10G:
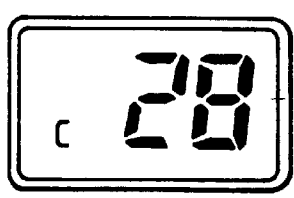
Figure 10H:

If the step (59) provides "No", a step (100) effects a check as to whether the mode switch 27 is "on". If the mode switch 27 is not "on", then a check is made as to whether the reproduction mode is released (step (65)). If the mode switch 27 is found to be "on", then a check is made as to whether the release switch 21 is "on" (step (61)). If it is "on", a start of erasing is instructed to the erase signal feeding circuit 9 by switching the switch SW1 to the C side, and erasing is displayed by causing a blinking twice of the two-digit seven-segment display of the ordinal number of the accessed track as shown in FIG. 10E, and "0" is set in the erased track bit in table in the memory 33 (step (64)). In the step (65), a check is done as to whether the reproduction mode is released by the switch 29. If the reproduction mode is released, the flow goes to the routine E in FIG. 6-1. If the reproduction mode is not released by the switch 29, a step (90) effects a check from the output of the timer circuit 40 as to whether the reproduction has continued for a predetermined period of time (for instance about 10 minutes). If this check provides "Yes", the power supplied from the power supply unit 13 is discontinued (step (91)). Suitably, the power supplied from the power supply unit 13 to parts other than the system control circuit 10, for instance at least the motor 3 or reproducing signal processing circuit 8, is discontinued.

In a subsequent step (92), whether the switch 21 is "on" is checked. If the switch 21 is not "on", the flow goes again to the step (56) to start reproduction again. If the switch 21 is not "on", a step (93) checks whether the reproduction mode is released like the step (65). If the reproduction is not released, the flow goes to the step (92). If the reproduction is released, the flow goes to the routine E.

In this embodiment, the reproduction mode is automatically discontinued after the lapse of a predetermined timer period from the instant of the setting of the reproduction mode and the start of reproduction. This is particularly advantageous in view of power saving for a small size recorder having limited power supply capacity as in this embodiment.

Further, after automatic discontinuation of the reproduction mode by the timer, the reproduction can be started again by turning on the release switch 21. This means that there is no need of providing any exclusive switch for setting the reproduction mode.

In the above embodiment, when the reproduction mode is set by the switch 29, the reproduction is started with an automatic execution of the steps (53) to (56). This is, however, by no means limitative. For example, by providing a step (95) of the turning-on of the release switch 21 and a step (97) of detecting the reproduction mode set by the switch 29, as shown by dashed line in FIG. 9, it is possible to control the start of reproduction operation at a desired timing.

Further, for erasing, the switch 27 for setting the recording mode is used for setting the erasing mode, and the switch 21 is used for actually causing erasing. Therefore, in this embodiment it is possible to increase a plurality of complicated functions without increasing switch operation members.

As has been shown, in the above embodiment there is no need of unnecessarily performing retrieval for non-recorded tracks. More specifically, a minimum of necessary non-recorded track retrieval is done when and only when the REV switch is turned on, and if a retrieved track is a recorded track, the head is no longer shifted, and no wasteful movement is involved. It is thus possible to provide a system, in which the non-recorded track retrieval at the time of the loading of a disk is done in a short period of time, and which never wastefully consumes power.

Further, the above embodiment permits a stand-by state to be set up quickly with a simple construction and without the possibility of double recording.

In the above embodiment, the setting means for setting a memory block change in the recording and reproduction modes is constituted by the FWD and REV switches 23 and 25, and the control means for causing the setting of the setting means differently in the recording and reproduction modes is constituted by the system control circuit 10. More specifically, the system control circuit 10 is adapted such that it causes shift of the head 2 to a non-recorded track in a specified direction when and only when the release switch 21 is turned on with the FWD and REV switches 23 and 25 in the "on" state in the recording mode, while in the reproduction mode it causes a shift of the head 2 to an adjacent track as soon as the FWD and REV switches 23 and 25 are turned on without turning-on of the release switch 21.

Thus, the above embodiment is by no means limitative; for example, it is possible to arrange such that in the recording mode a change of a block with which to effect recording may be instructed by the operation of other switches than the release switch 21, for instance a combination of the turning-on of the mode switch 27 and also the FWD and REV switches 23 and 25.

Further, it is possible to permit instruction of a change of block for recording therewith with a comparatively long predetermined "on" time of the switches 23 and 25.

In general, the change instruction may be made in any desired manner so long as the block with which to effect recording or reproduction is changed in different manners in the recording and reproduction modes.

Thus, with the above embodiment it is possible to effect a block change reliably in either the recording or reproduction mode.

The above embodiment is concerned with the still video recorder shown in FIG. 1 as an erasing apparatus having at least either one of a recording and reproduction functions and an erasing function. However, this apparatus is by no means limitative, and the invention is applicable to various other apparatuses as well.

Further, in the above embodiment the setting means for setting an erasing operation in the erasing mode and setting a recording or reproduction mode condition at the time of the recording or reproduction, is constituted by a mode switch for setting a stand-by state at the time of erasing and switching a serial or single recording mode at the time of the recording or reproduction. Such a switch, however, is by no means limitative. For example, a trigger switch for execution of erasing may also be used as a switch for setting a different recording/reproduction mode condition for the recording or reproduction.

Further, the mode conditions of the recording or reproduction operation are not limited to the serial and single recording mode settings as noted above, but it is possible to provide other conditions, for instance the setting of a serial recording speed or the setting of a field or frame recording mode as a recording mode condition.

With the above embodiment of the invention, it is possible to set an erasing apparatus, which is simple in construction and has a satisfactory operational control property.

Further, while the above embodiment is concerned with a still video recorder, this is by no means limitative, and the invention is applicable to various different recording or reproducing apparatuses to obtain the same advantages.

Further, as the memory means may be used as a tape-like means as well as disk as in the above embodiment. Also, they may be an optical disk or a solid memory.

Now, a different embodiment of the invention will be described, which is applied to a recording or reproducing apparatus, which ensures reliable operation in various modes of operation and permits an effective use of the power supply.

Such an apparatus may be one, which comprises a means for detecting the voltage of a power supply unit, a setting means for setting the reference voltages for recording, reproduction and erasing modes, and a comparing means for comparing the detected voltage of the power supply unit to the reference voltages and which is further provided with a control means for restricting the operation in a set mode of the recording or reproducing apparatus according to the resultant output of the comparing means, thus permitting a reduction of power consumption in the use of a power supply unit, of which limitation is imposed on the power supply capacity, and a reliable operation in each mode of operation. Also, such an apparatus may be one, which is provided with a means for discriminating a plurality of power supply units, thus permitting reliable operation in each operation mode for a plurality of power supply units having different characteristics, by varying the reference voltage level according to the result of the discrimination of the power supply unit.

Now, the above embodiment of the recording or reproducing apparatus will be described in detail with reference to the drawings.

Figure 11:
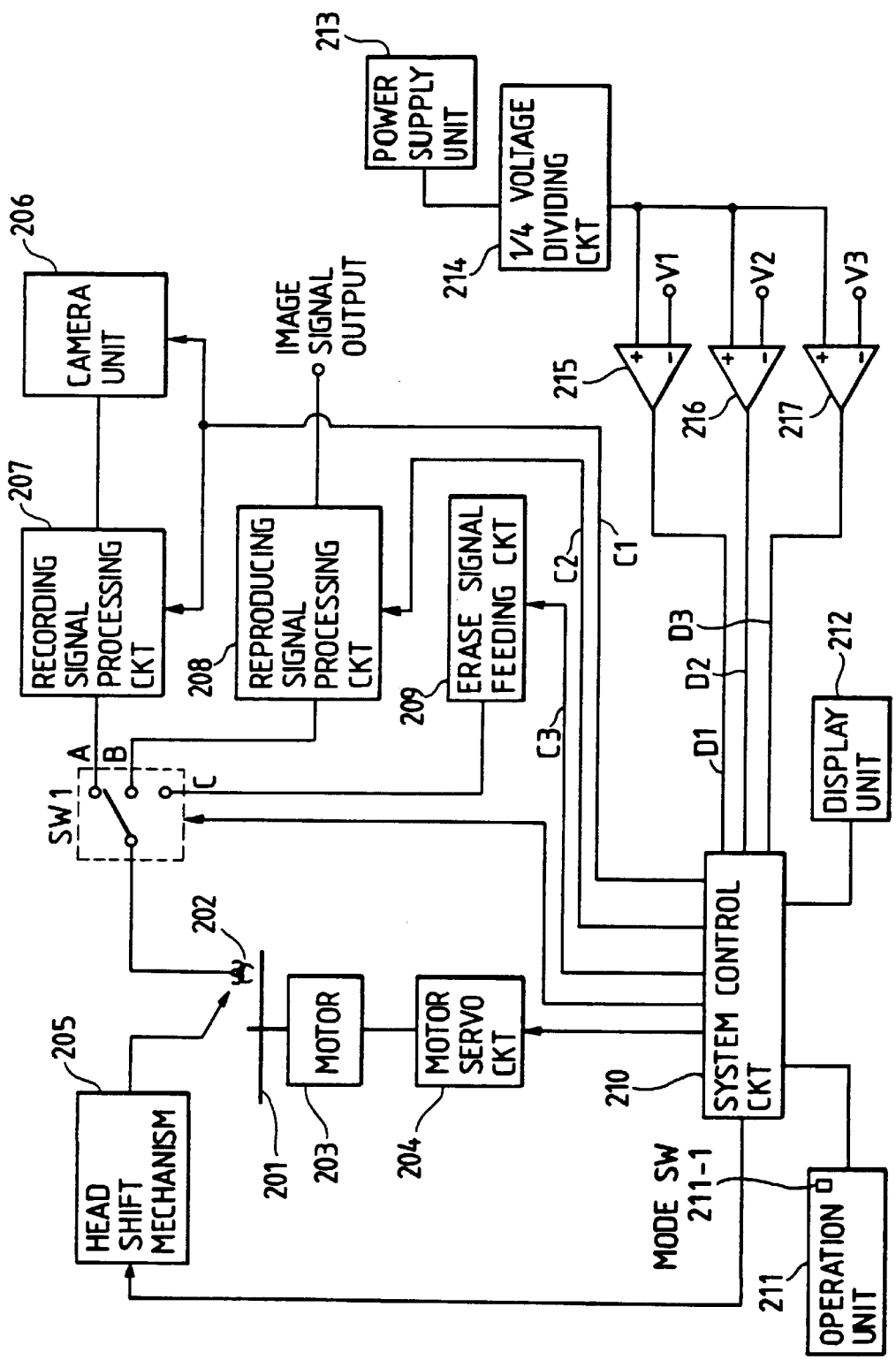
FIG. 11 is a schematic representation of a different embodiment of the invention.

FIG. 11 is a schematic representation of an electronic camera for recording, reproducing and erasing a video signal in concentric circular tracks on a rotating magnetic disk. Referring to the Figure, reference numeral 201 designates a magnetic disk as a recording medium, and 202 a magnetic head, which can be shifted in the radial direction of the disk 201 for effecting recording, reproduction or erasing of signal on tracks formed on the disk. The disk 201 is rotated by a motor 203. A servo motor circuit 204 controls the motor 203 to cause constant speed rotation of the disk 201. A head shift mechanism 205 can cause a shift of the head 202 in the radial direction of the disk 201 so that the head accesses the concentric circular tracks on the disk 201. Reference numeral 206 designates a camera unit including an optical system including a recording lens, a stop shutter and a recording element for converting the video data obtained from the optical system into an electric signal. A recording signal processing circuit 207 performs processing such as frequency modulation on the electric signal from the camera unit to obtain a signal suited for recording on the disk. The signal from this circuit 207 is supplied through a switch SW1 to the head 202. A reproducing signal processing circuit 208 receives the reproduced signal from tracks on the disk 1 by the head through a switch SW1, and it performs processing such as frequency demodulation on the received signal to recover the original video signal which is provided to a video signal output terminal. An erasing signal feeding circuit 209 supplies an erasing current to the head 202. Reference numeral 210 designates a system control circuit for controlling the present apparatus, i.e., the motor servo circuit 204, head shift mechanism 205, camera unit 206, recording signal processing circuit 207, reproducing signal processing circuit 208, erasing signal feeding circuit 209, and switch SW1, etc.

Figure 17A:
FIGS. 17A and 17B are views showing examples of display on display unit 12 shown in FIG. 11.
Figure 17B:
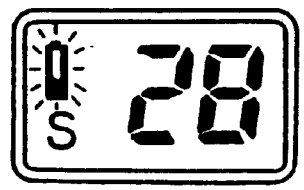

An operation unit 211 provides instructions corresponding to various modes to the system control circuit 210. It has a mode switch 211-1 for setting a recording mode, a reproduction mode and an erasing mode. A display unit 212 displays data concerning the individual modes under control of the system control circuit 210. It displays the ordinal number of the track being accessed by the head 202 and an alarm of voltage reduction, as shown in FIGS. 17A and 17B to be described later. Reference numeral 213 designates a power supply unit for supplying power to various components of the apparatus. A voltage dividing circuit 214 divides the voltage from the power supply unit 213 by ¼. Voltage comparators 215 to 217 receive the output signal of the ¼ voltage dividing circuit 214 at the plus terminal and respective predetermined voltages V1 to V3 (V1<V2<V3) at the minus terminal. The output signals of the voltage comparators 215 to 217 are input to the system control circuit 210.

Now, the operation of this embodiment will be described in detail.

When a recording mode setting instruction is supplied from the mode switch 211-1 provided in the operation unit 211 to the system control circuit 210, the circuit 210 effects a check as to whether the output of the voltage comparator 215 is "High" or "Low". At this time, a voltage at ¼ of the power supply voltage level is supplied to the plus input terminal of the voltage comparator 215, while a voltage V1 at ¼ of the power supply voltage level for inhibiting the recording operation is supplied to the minus terminal of the voltage comparator. If the output signal of the voltage comparator 215 is at a "High" level, it is determined that the voltage of the power supply unit is higher than the recording operation inhibition voltage level, and the system control circuit 210 thus causes the driving of the camera unit 206, it also causes recording signal processing circuit 207 and the servo motor circuit 204 to execute recording operation. At this time, the system control circuit 210 controls the servo motor circuit 204 to cause a constant speed rotation of the magnetic disk 201 and it also controls the stop, shutter, etc. in the camera unit 206. Thus, the electric signal obtained from the recording element converting image data is supplied to the recording signal processing circuit 207. Since the switch SW1 is connected to the A side, the signal from the recording signal processing circuit is supplied to the magnetic head 202, whereby the video data in the form of an electric signal is recorded on tracks on the disk 201. When the recording of data on a track is ended, the system control circuit 210 controls the head shift mechanism 205 to shift the head 202 to the next track. At this time, the system control circuit 210 checks again whether the next recording mode setting instruction is supplied from the operation unit 211. If the instruction is supplied, it checks the output signal of the voltage comparator 215 again. If the comparator output signal is at "High" level, the control described above is effected again. If recording on the last track on the disk 201 is completed, recording operation is no longer performed even if the recording mode setting instruction is provided.

The number of the track accessed by the head 202 is displayed on the display unit 212, which is controlled by the system control circuit 210. Every time the head 202 is shifted by one track after the completion of recording in the preceding track, the display content is updated, so that the number of track accessed by the head 202 is displayed at all times. Now a case is considered, when the output signal of the voltage comparator 215 is at a "Low" level when the recording mode setting instruction is supplied from the operation unit 211 to the system control circuit 210. When the output signal of the voltage comparator 215 is at the "Low" level, it is determined that the voltage of the power supply unit is lower than the recording operation inhibition voltage level. In this case, the system control circuit 210 inhibits the recording operation. More specifically, in this case it is inhibited from driving the motor servo circuit 204 and from rotating the magnetic sheet 201 and also inhibits the control of the camera unit 206 and the recording signal processing circuit 207. Hence, no recording operation sequence is brought about. At this time, the system control circuit 210 controls the display unit 212 to cause the blinking of a display "Lb" (indicating low battery voltage) as shown in FIG. 17A. The system control circuit 210 is continuously detecting the output signal of the voltage comparator 215 during the recording operation, and when the output of the voltage comparator 215 is changed to a "Low" level during recording, it causes the low power supply voltage display, as noted above, on the display unit 212 after the end of recording on one track. In other words, the system control circuit 210 effects such control that when recording in one track is started, it is not stopped before completion, but the recording operation is inhibited after the end of this recording operation.

Now, a case is considered, in which a reproduction mode setting instruction is supplied from the mode switch 211-1 in the operation unit 211 to the system control circuit 210. When the reproduction mode setting instruction is supplied, the system control circuit 210 checks whether the output signal of the voltage comparator 216 is "High" or "Low". A voltage equal to ¼ of the voltage supplied from the power supply unit is supplied to the plus input terminal of the voltage comparator 216, while voltage V2 at ¼ of the power supply voltage level, for inhibiting the reproducing operation, is supplied to the minus input terminal of the voltage comparator. If the system control circuit 210 detects that the output signal of the voltage comparator 216 is "High", it determines that the power supply voltage level is higher than the reproduction operation inhibition voltage level. Thus, it drives the motor servo circuit 204 to drive the motor 203 so as to cause a low speed rotation of the magnetic disk 201. Further, the circuit 210 switches the switch SW1 to the B side to cause the operation of the reproducing signal processing circuit. That is, a reproduction signal is supplied from track on disk 201 through the head 202 and a switch SW1 to the reproducing signal processing circuit 208, and the circuit 208 thus produces a reproduced video signal. Again, during the reproduction operation, the system control circuit 210 is detecting the output signal of the voltage comparator 216 at all times. If the power supply unit voltage is reduced during the reproduction operation to the reproduction operation inhibition level, the output signal of the voltage comparator 216 is inverted to a "Low" level. When the system control circuit 210 detects this, it controls the motor servo circuit 204 to stop the motor 203, and it also stops the operation of the reproducing signal processing circuit and hence reproduction operation. At this time, the circuit 210 controls the display unit 212 to produce the low power supply voltage display, i.e., blinking "Lb" as noted before, on the display unit 212. If the output signal of the voltage comparator 216 is at a "Low" level when the reproduction mode setting instruction is supplied from the operation unit 211 to the system control circuit 210, no reproduction operation is executed, but the low power supply voltage display is provided on the display unit 212, indicating that the reproduction is inhibited. The erasing operation will now be described. The erasing operation setting instruction is supplied from the operation unit 211 to the system control circuit 210. However, the erasing operation can be executed when and only when the apparatus is in the reproduction mode. That is, the erasing operation is never executed even when the erasing operation setting instruction is supplied from the operation unit to the system control circuit 210 in a mode other than the reproduction mode of the apparatus. When the erasing operation setting instruction is supplied from the operation unit 211 to the system control circuit 210 in the reproduction mode, the system control circuit checks whether the output signal of the voltage comparator 217 is at a "High" or a "Low" level. A voltage equal to ¼ of the voltage from the power supply unit is supplied to the plus input terminal of the voltage comparator 217, and voltage V3 corresponding to ¼ of the power supply voltage level for inhibiting the erasing operation is supplied to the minus input terminal. That is, the system control circuit determines the power supply voltage level to be able to cause the erasing operation when the output signal of the voltage comparator 217 is at a "High" level and be reduced to the erasing operation inhibition level when the voltage comparator output voltage is at "Low" level. When the output signal of the voltage comparator 217 is at a "High" level, the system control circuit 210 stops the operation of the reproducing signal processing circuit 208, switches the switch SW1 to the C side and operates the erasing signal feeding circuit 209. The erasing signal thus is supplied through the switch SW1 to the head 202 to effect erasing of one track on disk 1 which is accessed by the head. When the erasing of one track is completed, the system control circuit 210 stops the operation of the erasing signal feeding circuit, switches the switch SW1 to the B side and causes the operation of the reproducing signal processing circuit 208 again. As a result, the reproducing signal processing circuit 208 produces a reproducing signal on the erased track, i.e., random noise, so that the completion of the erasing operation can be confirmed.

When the output signal of the voltage comparator 217 is at a "Low" level, when the erasing operation setting instruction is supplied from the operation unit to the system control circuit 210 in the reproduction mode of the apparatus, the power supply voltage is determined to be lower than the erasing operation inhibition voltage level. The system control circuit 210 thus controls the display unit 212 to cause a blinking display of "Lb," indicative of a low power supply voltage on the display unit. At this time, the reproduction mode is not interrupted, but a reproduction video signal is continually provided from the reproducing signal processing circuit 208. Further, the system control circuit 210 controls the display unit such that the blinking "Lb" display indicative of the fact that the power supply voltage level is lowered so that the erasing operation can not be executed is continued only while the erasing operation setting instruction from the operation unit prevails and is discontinued with vanishment of the erasing operation setting instruction.

Now, a case where a plurality of power supplies having different characteristics are used in the power supply unit 213 will be considered. First, a method of discriminating the power supplies will be described.

Figure 13:
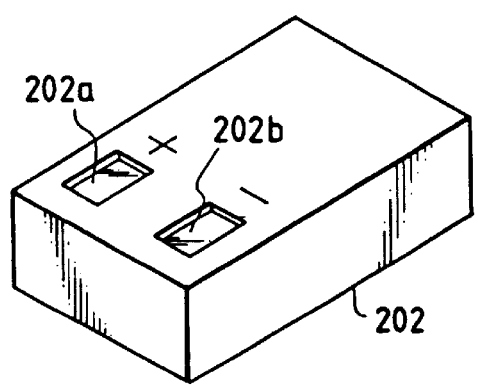
FIGS. 13 and 14 are perspective views showing a power supply.
Figure 14:
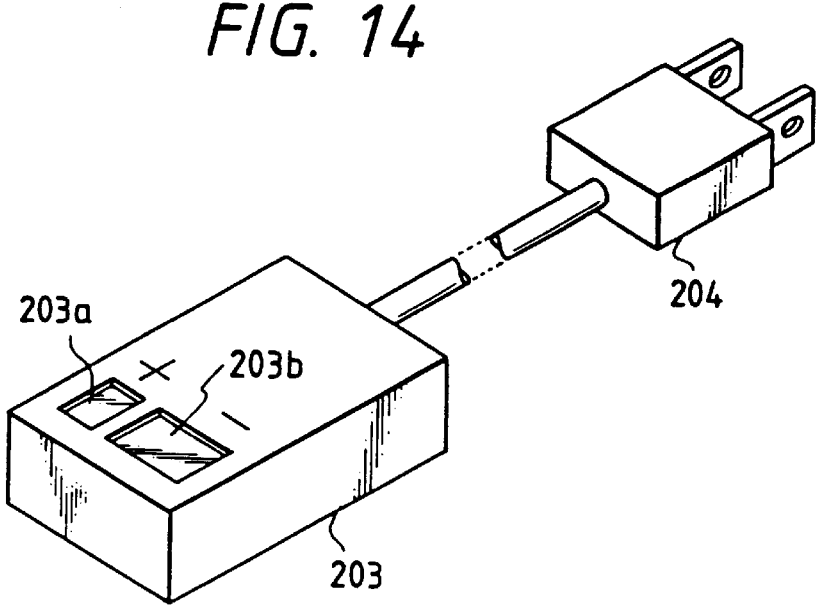
Figure 15:
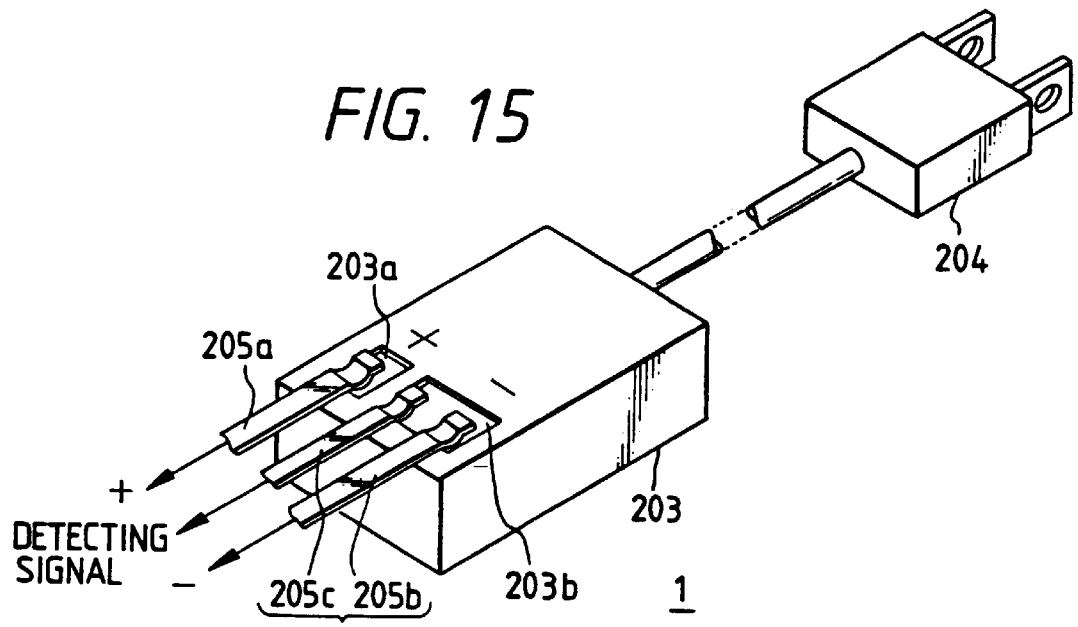
FIGS. 15 and 16 are perspective views showing identification terminals of power supply.
Figure 16:
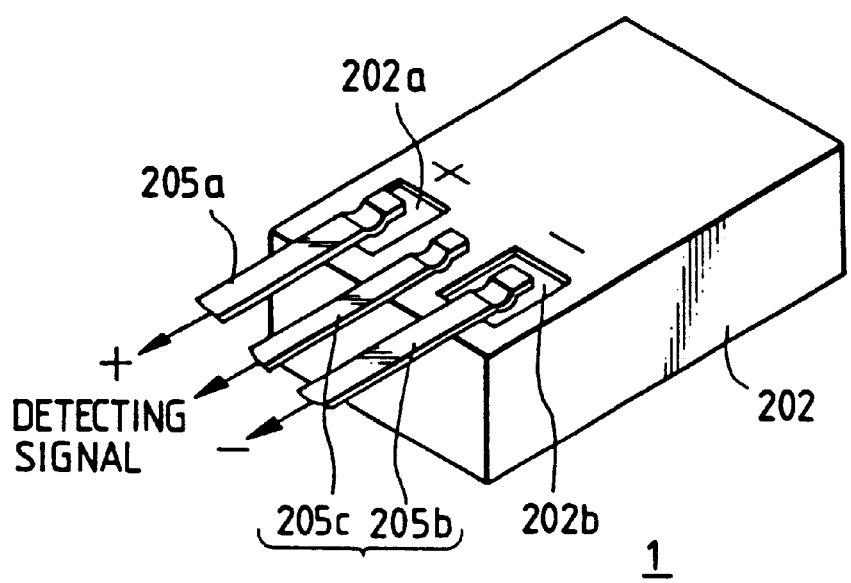

FIGS. 13 to 16 are views for explaining a case when a power supply discriminating means discriminates between a battery and an AC power source adapter. FIG. 13 is a perspective view showing the battery, FIG. 14 is a perspective view showing the AC power source adapter, and FIGS. 15 and 16 are perspective views showing the AC power source adapter and battery, respectively, accommodated in battery accommodation section of the apparatus.

Referring to these Figures, reference numeral 201 designates a battery accommodation section formed in the apparatus, 202 is a battery accommodated in the battery accommodation section, and 203 is an AC power source adapter body capable of supplying power to unit accommodated in the battery accommodation section. The AC power source adapter body 203 is provided with a plug 204. The battery 202 has plus and minus electrodes 202a and 202b respectively provided on the top, and the corresponding top surface of the AC power source adapter 203 is provided with plus and minus electrodes 203a and 203b respectively. One of the pair electrodes, for instance minus electrode 203b, has a greater width than the electrode 202b of the battery 202.

In the battery accommodation section 201, plus and minus connector pieces 205a and 205b are provided as power supply terminals. When the battery 202 or the AC power source adapter 203 is accommodated in the battery accommodation section 201, the plus connector piece 205a is connected to the plus electrode 202a of the battery 202 or to the plus electrode 203a of the AC power source adapter 203, while the minus connector piece 205b is connected to the minus electrode 202b of the battery 202 or to the minus electrode 203b of the AC power source adapter 203. Further, a discriminating connector piece 205c is provided, which is in contact with none of the electrodes of the battery 202 when the battery 202 is mounted as shown in FIG. 16 while it is in connect with the wide minus electrode 203b of the AC power source adapter 203 together with the minus connector piece 205b when the AC power source adapter is mounted. When the battery 202 is mounted, the power supply connector pieces 205a and 205b are connected to the corresponding electrodes 202a and 202b, but the discriminating connector piece 205c is in contact with the battery top but in contact with neither electrode.

When the AC power source adapter 203 is mounted, the power supply connector pieces 205a and 205b are connected to the electrodes 203a and 203b to form a power supply-circuit, while the discriminating connector piece 205c is connected to the electrode 203b, so that the connector pieces 205b and 205c are held in electric conduction with each other by the electrode 203b. In this way, it is possible to provide for an electric discrimination in the case when the battery 202 is mounted in the battery accommodation section and the case when the AC power source adapter 203 is accommodated.

Now, the case when discrimination information of the power supply discriminating means including the power supply discriminating connector piece 5c noted above is used for the operation mode control of a recording or reproducing apparatus, will be described in connection with an example with reference to FIG. 23.

Figure 23:
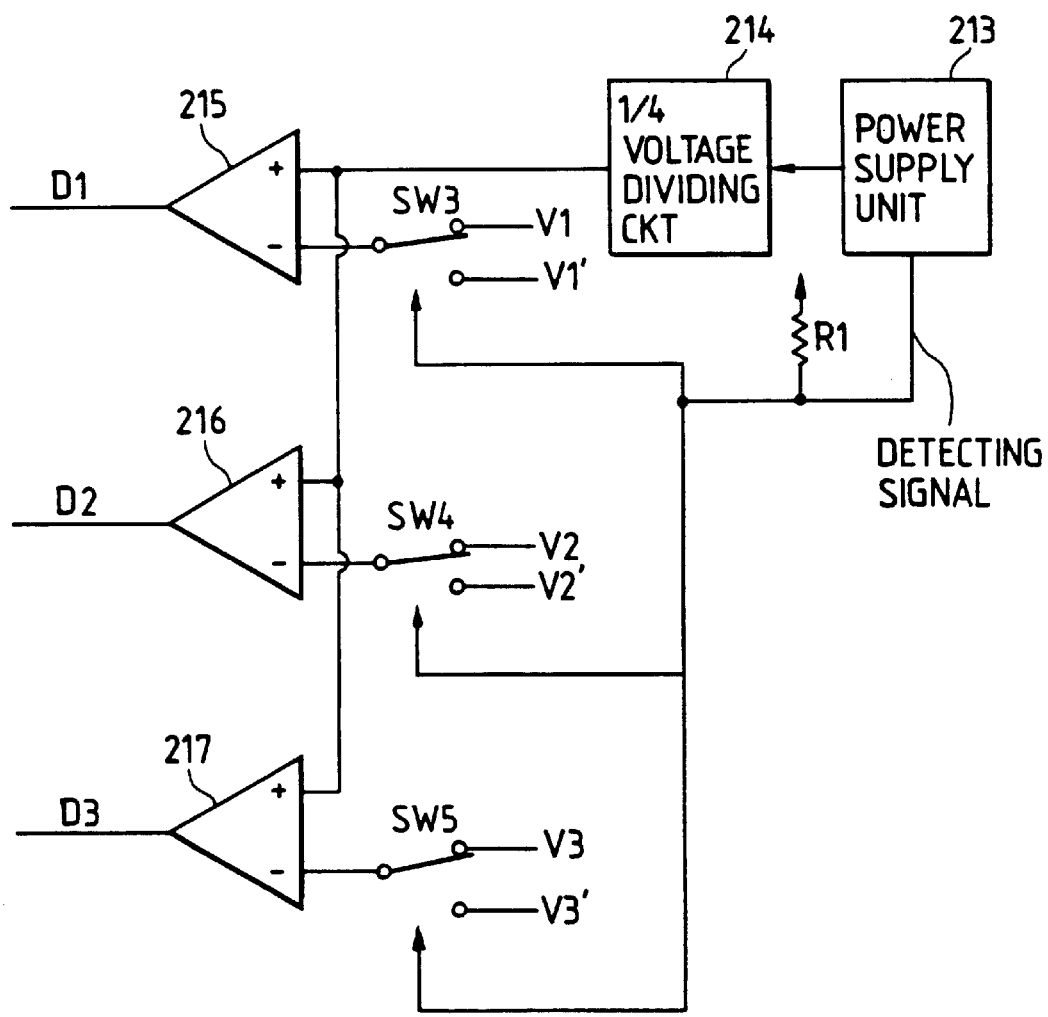
FIG. 23 is a schematic representation of a different example of voltage comparator.

FIG. 23 is a schematic representation of an arrangement for using discrimination information of the power supply discriminating means for operation mode control of the recording or reproducing apparatus. As is shown, levels of the voltage supplied to the minus input terminal of each of the voltage comparators 215 to 217 in FIG. 11 are switched according to the power supply discrimination information.

When the power supply as shown in FIG. 13 is mounted in the power supply unit 13 shown in FIG. 11, the discriminating connector piece 5c is not connected to the minus electrode of the power supply. Therefore, the detection signal is "High" due to a resistor R1. Thus, the switches SW3 to SW5 are switched to the side of voltages V1 to V3, and these voltages V1 to V3 are supplied to the minus input terminals of the respective voltage comparators 215 to 217. When the power supply as shown in FIG. 14 is mounted in the power supply unit, the discriminating connector piece 5c is connected to the minus electrode of the power supply. The detection signal in this case is "Low", and the switches SW3 to SW5 are switched to the side of voltages V1' to V3', which are thus supplied to the minus input terminals of the voltage comparators. It is to be understood that either voltages V1 to V3 or voltages V1' to V3' are supplied as recording, reproduction and erasing inhibition voltages depending on the kind of power supply used.

While the above description of the discrimination of power supplies and switching of the recording reproduction and erasing inhibition voltages according to discrimination information has concerned with the case, in which a battery and a 12 AC power source adapter are available as power supply, the power supplies are not limited to the above two kinds. For example it is possible to permit switching of the levels of voltage supplied to the minus terminals of the voltage comparators for such plurality of power supplies as an AC power source adapter, a NiCd battery, a lead battery and an alkali-maganese battery by appropriately changing the number and positions of formation of discriminating electrodes and connector pieces. In this way, it is possible to set recording, reproduction and erasing inhibition voltage levels in correspondence to the characteristics and capacity of the individual power supplies.

Further, the method of power supply discrimination in the above embodiment is by no means limitative; for example, a load may be connected to each of a plurality of different power supplies, and the individual power supplies may be discriminated by determining the characteristics of terminal voltage reduction.

Figure 18:
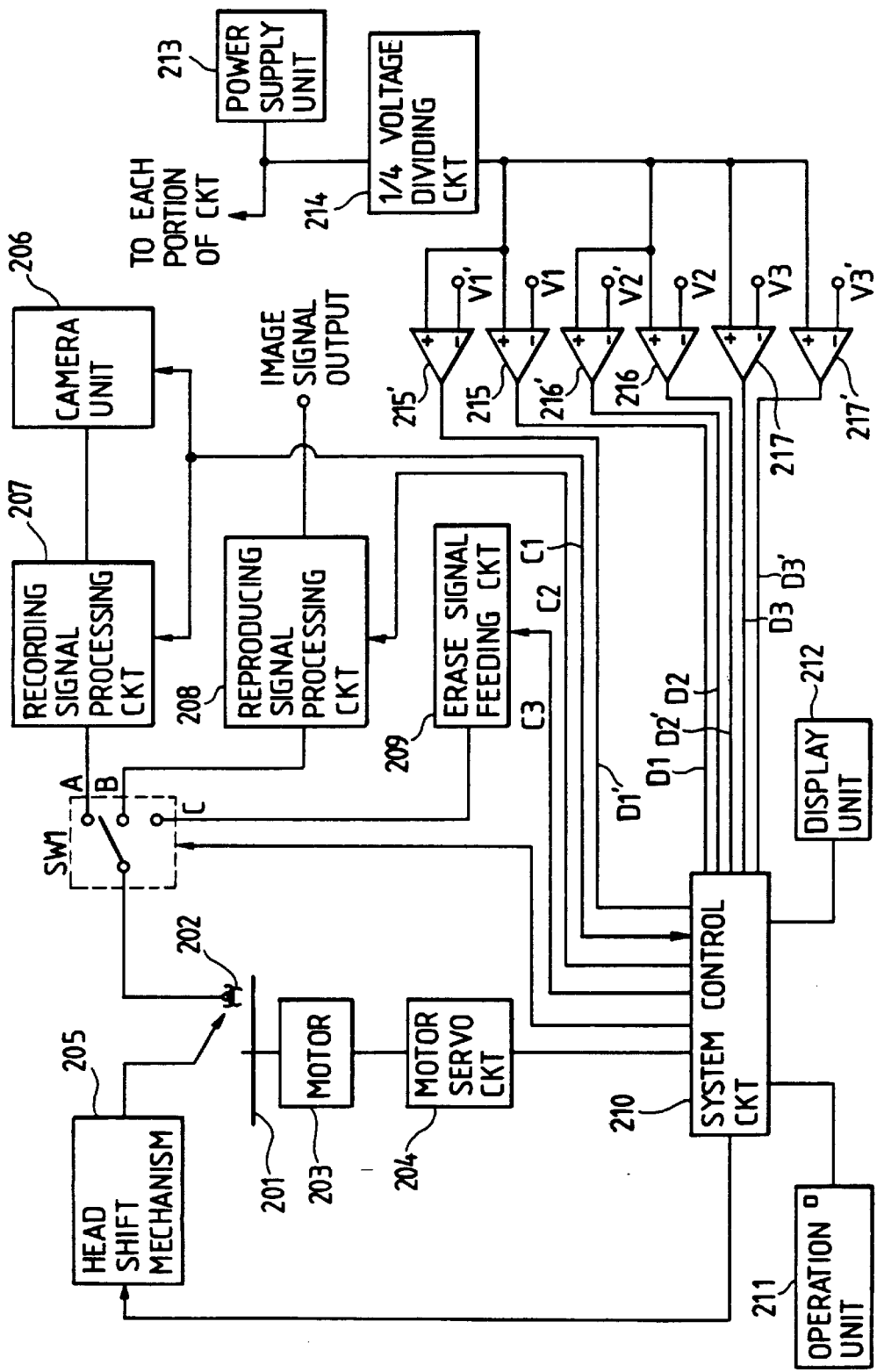
FIG. 18 is a schematic representation of a further embodiment of the invention.

In the above embodiment, when the power supply voltage becomes lower than the operation inhibition voltage in each of the recording, reproduction and erasing modes, the operation is discontinued while providing a display as shown in FIG. 17A. FIG. 18 is a modification of the construction shown in FIG. 11. In this instance, a set of voltage comparators 215' to 217' like those 215 to 217 in FIG. 11 are provided additionally, and their reference voltages V1' to V3' are set to be slightly higher than the respective voltages V1 to V3. In this case, a mark "□" as shown in FIG. 17B may be displayed on the display unit 12 according to the outputs of the voltage comparators 215' to 217'. In the display example shown in FIG. 17B, the display "28" indicates the position of the head 2 relative to the disk 1. In the display example shown in FIG. 17A, a display "Lb" is provided by using such position display segments. This permits further simplification of the construction.

The operation of the embodiment of FIG. 18 will now be described with reference to the flow charts of FIGS. 19 to 22.

FIGS. 19 to 22 show flow charts for explaining he operation of the system control circuit 10.

Figure 19:
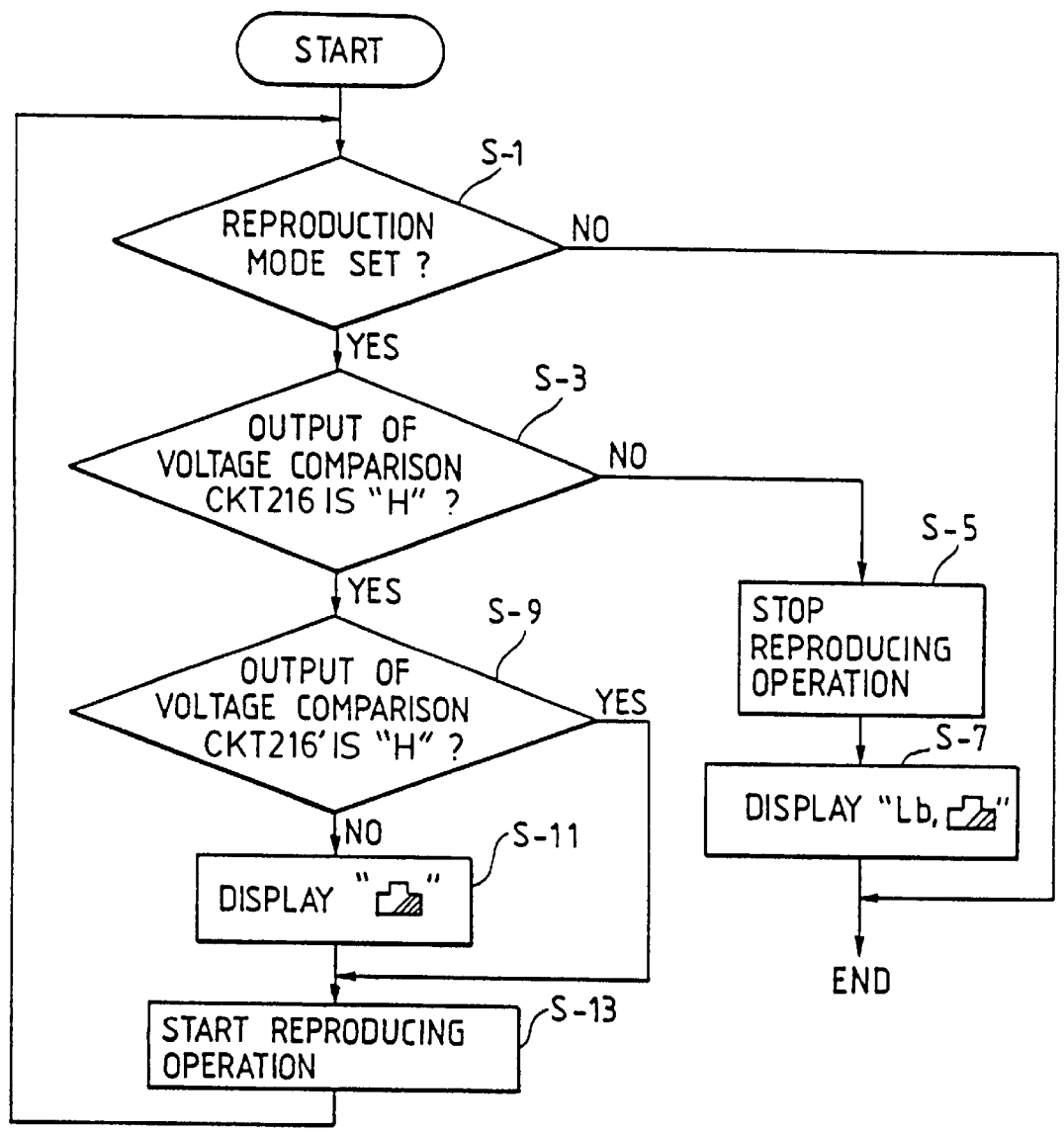
FIGS. 19 to 22 are flow charts for explaining the operation of the embodiment of FIG. 18.

The flow chart of FIG. 19 is for operation when the reproduction mode is set.

In this flow, a check is first done to confirm that the reproduction mode is set (step S-1). Then a check is done as to whether the output of the voltage comparator 216 is "H"

(step S-3). If the output is not "H", the motor 203 is stopped to stop the operation of the reproducing signal processing circuit, thus preventing abnormal operation due to voltage reduction (step S-5). Then, a display as shown in FIG. 7A is produced on the display unit (step S-7). If it is found in the step S-3 that the output of the voltage comparator 216 is "H", a check is made as to whether the output of the voltage comparator 216' is "H" (step S-9). If the output is "H", the reproduction operation is started or continued (step S-13). If the output of the voltage comparator 216' is not "H", the display as shown in FIG. 17B is produced on the display unit 212, and the flow goes to the step S-13. In this case, the reproduction operation is not stopped but is continued until the reproduction mode is released or until the voltage comparator 216 detects low power supply voltage.

The operation when the recording mode is set will now be described with reference to FIG. 20.

In this flow, it is first confirmed that the recording mode is set (step S-15). If the recording mode is set, a check is done as to whether the output of the voltage comparator 215 is "H" (step S-17). If the output is not "H", the operation of the recording signal processing circuit 207 and camera unit 206 is stopped. In this case, the motor 203 is continually driven for there is a case when the operation is possible by setting the reproduction mode. It is possible to stop the motor 203 in the step S-19 for saving power. A step S-20 provides a display as shown in FIG. 17A like the step S-7. If the output of the voltage comparator 215 is "H", a check is done as to whether the output of the voltage comparator 215' is "H" (step S-22). If the output is not "H", a step S-23 provides a display as shown in FIG. 7B like the step S-11. A step S-25 detects a recording level trigger, and if the trigger is detected, the recording control is started. For starting the recording operation, the start of recording is instructed to the camera unit 206 and the recording signal processing circuit 207.

Then, a check is done as to whether the recording operation is over (step S-27). If it is not over, a check is done as to whether the output of the voltage comparator 215 is "H" (step S-29). If the output is not "H", a flag LB1FLAG is set (step S-31). Then a check is done as to whether the output of the voltage comparator 215' is "H" (step S-33). If the output is not "H", a flag LB2FLAG is set (step S-35). If the output is "H", the flow returns to the step S-27. If it is determined in the step S-27 that the recording operation is over, whether the flags LB1FLAG and LB2FLAG are set are checked (steps S-37 and S-39). If LB1FLAG is set, the flow goes to the step S-19. If LB2FLAG is set, a display as shown in FIG. 7B is produced like the step S-23, and the head 202 is shifted by one track (step S-41), the number of the track displayed on the display unit 212 is changed (step S-43), and the flow then returns to the step S-15.

After the recording operation is actually started by the recording trigger in the recording mode, even if voltage reduction is detected from the outputs of the voltage comparators 215 and 215', the inhibition of the operation of the apparatus and display of alarm are not effected until such operation of recording or reproduction is over, and the inhibition of operation or display of alarm is effected only when the operation is over. Thus the recording operation once started can be performed reliably, and the operator can use the apparatus with a sense of security.

Now, operation when the erasing operation is instructed will be described with reference to FIG. 21.

First, a check is done as to whether the start of erasing operation is instructed (step S-51). If it is instructed, then a check is made as to whether the reproduction operation in force is (step S-53). If the reproduction operation in force, the flow goes to a step S-55. Otherwise, the flow returns to the step S-51 without the executing erasing operation.

The step S-55 checks whether the output of the voltage comparator 217 is "H". If the output is "H", the erasing operation is started (step S-57). It is checked that the output of the voltage comparator 217 is "H" until the step S-59 detects the end of erasing operation (step S-61). If the output is not "H", the flag LB2FLAG is set (step S-63).

When the erasing operation is over, whether the flag LB2FLAG is set is checked (step S-65). If it is not set, the flow jumps to the step S-1 in FIG. 11. If it is set, a display as shown in FIG. 7A is produced, and a check is done as to whether the start of erasing operation in instructed (step S-67). If it is instructed, the display of "Lb" on the display unit 212 is released (step S-70), and the flow goes to the step S-1 in FIG. 9.

As has been shown, in this embodiment if the power supply voltage level is not above a predetermined level in the presence of a direction to start the erasing operation, a display as shown in FIG. 7B is provided on the display unit 212. Further, the display noted above on the display unit 212 is automatically released with the release of the direction to start the erasing operation.

Further, like the case described before in connection with FIG. 20, even when the power supply voltage level is reduced during the erasing operation neither the control for stopping the erasing operation nor display of alarm is effected, but such control or display is effected after completion of the erasing operation.

Figure 20:
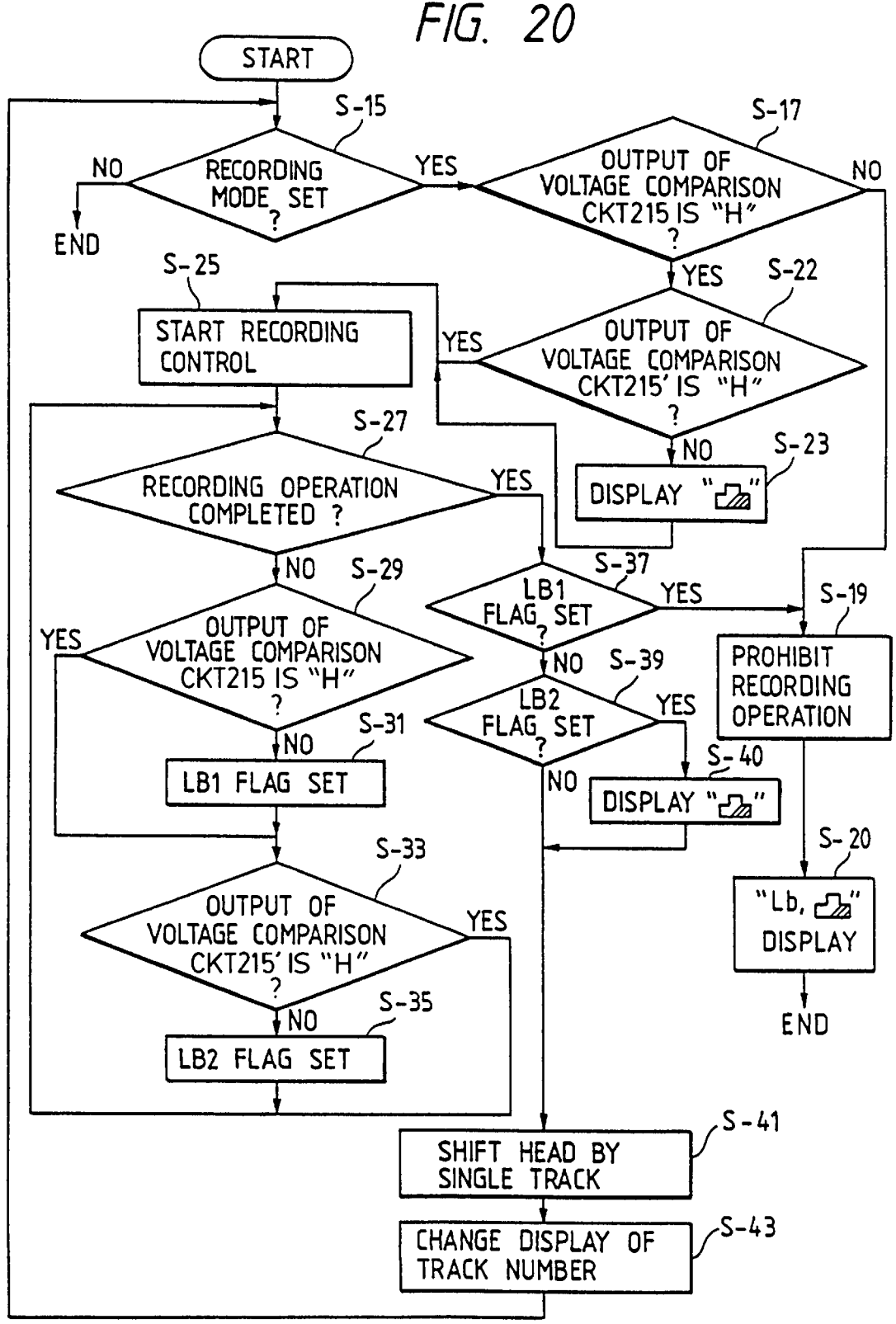
Figure 21:
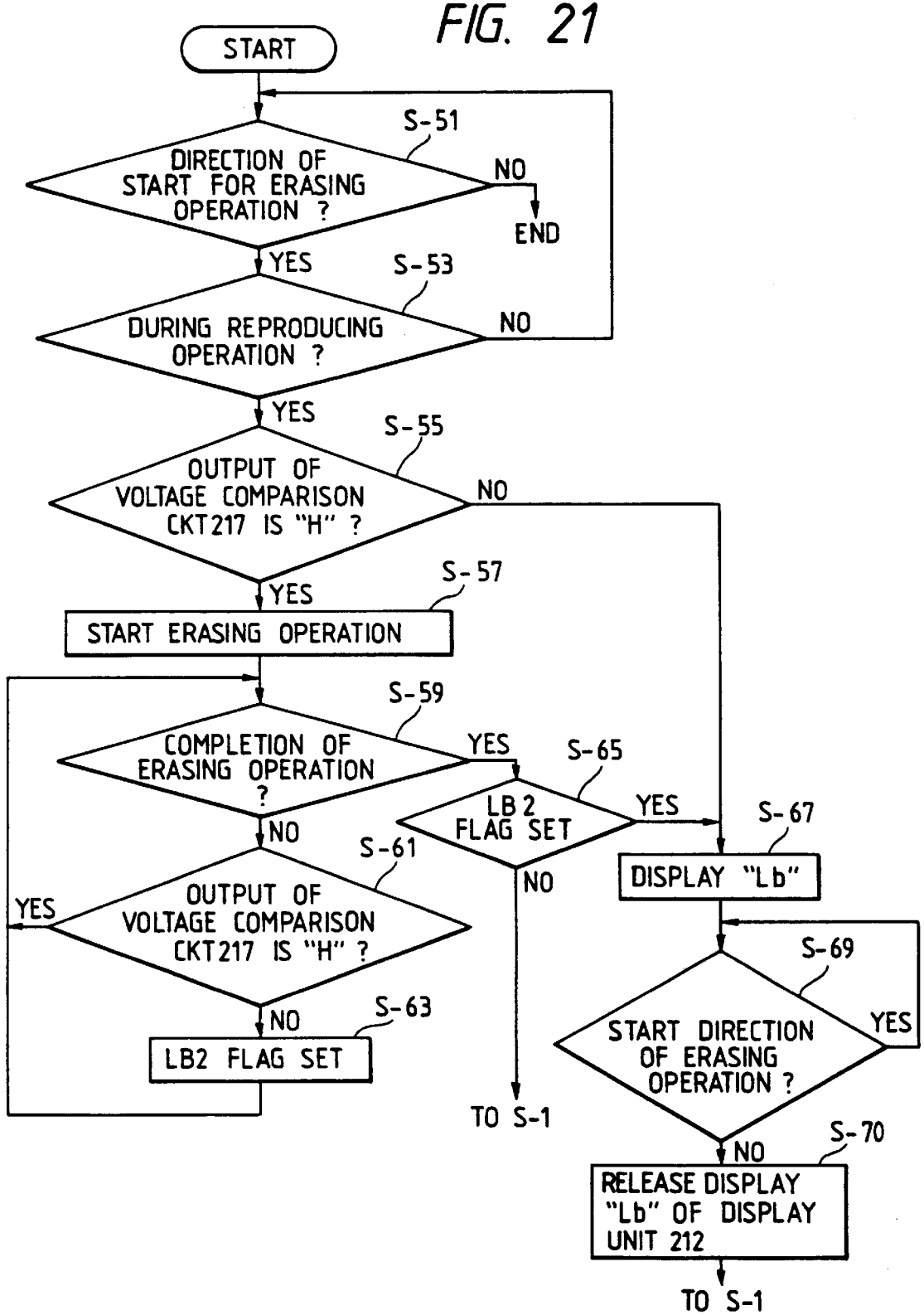

Further, while the flow shown in FIG. 21 is concerned with only the output of the voltage comparator 217, like the flow shown in FIG. 20, both the outputs of the voltage comparators 217 and 217' may be used to provide either of the displays shown in FIGS. 17A and 17B.

Further, although the construction shown in FIG. 18 has a large number of voltage comparators, i.e., voltage comparators 215 to 217 and 215' to 217' and is thus complicated, it may be simplified by setting equal the alarm voltage when providing the display shown in FIG. 17B in the reproduction mode and inhibition voltage when providing the display shown in FIG. 17A at the time of erasing.

Figure 22:
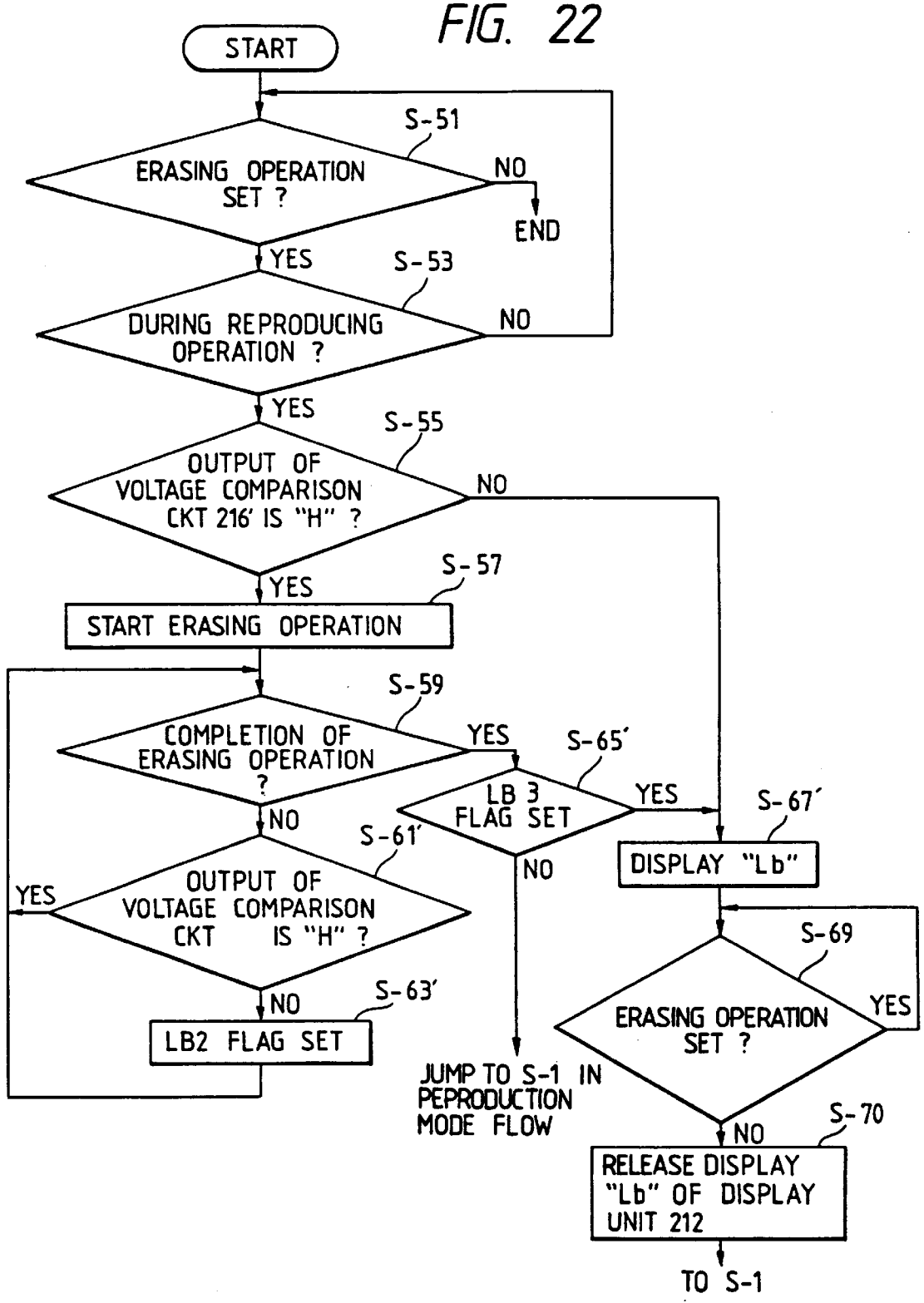

In such a case, the flow chart shown in FIG. 21 is changed to one shown in FIG. 22. In the flow chart of FIG. 21 the step S-61 checks whether the output of the voltage comparator 217 is "H". In the flow chart of FIG. 22, a step S-61' checks whether the output of the voltage comparator 216' is "H".

Further, while in the flow chart of FIG. 21 the flag LB2FLAG is used for the steps S-63 and S-65, in the flow chart of FIG. 22 the flag LB3FLAG may be used.

(Other Embodiment)

Figure 12:
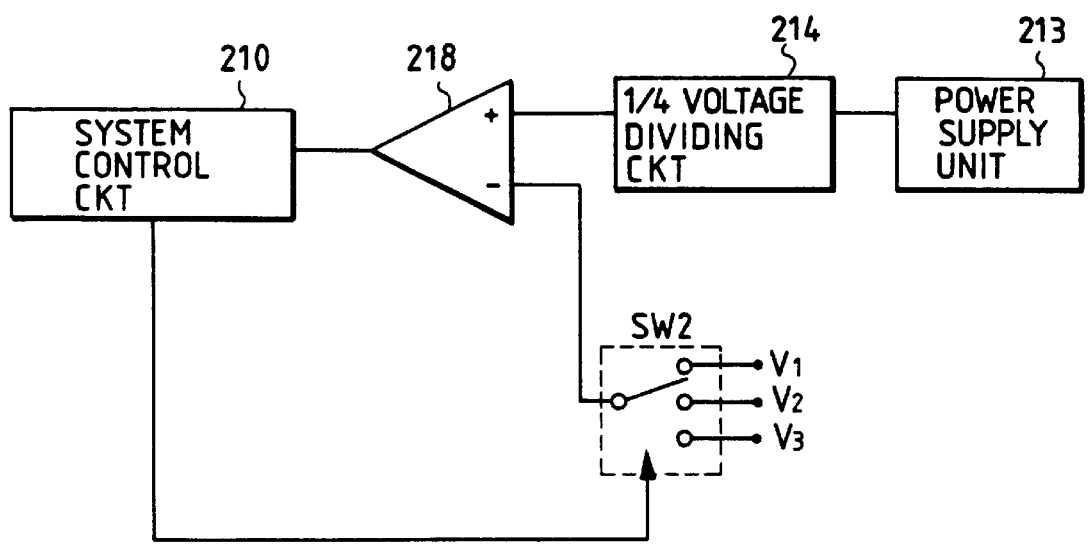
FIG. 12 is a schematic representation of a different example of voltage comparator.

FIG. 12 shows a different example of voltage comparator. In the FIG. 12, blocks like those in FIG. 11 are designated by like reference numerals, and they are not described any further. The voltage comparator 218 is supplied a voltage at ¼ of the voltage level of the power supply unit like the voltage comparators 215 to 217 shown in FIG. 11. Recording, reproduction and erasing inhibition voltages V1 to V3 may be supplied through a switch SW2 to the minus terminal of the power supply unit. The switch SW2 is switched by the system control circuit 210. The system control circuit 210 controls the switch SW2 such that the inhibition voltage level corresponding to a mode instructed by the operation unit 211 is supplied to the minus terminal of the voltage comparator 218 and detects the output signal level of the voltage comparator 218 to determine the power supply voltage level so as to control the operation of the apparatus. Further, it is possible to supply a voltage of a constant level to the minus terminal of the voltage comparator 218 and shift the level of the voltage, i.e., ¼ of the power supply voltage, supplied to the minus input terminal of the voltage comparator 218 according to the recording, reproduction and erasing modes. In this way, the same advantages can obviously be obtained. While in FIG. 12 three different voltages to be supplied to the plus input terminal are shown, it is possible to prepare six different voltages as shown in FIG. 18 as in FIG. 18.

As has been shown, by setting the power supply voltage levels of inhibition in the recording, reproduction and erasing modes, it is possible to ensure reliable operation in each mode under different power consumption conditions of the recording, reproduction and erasing operations.

Further, by setting the inhibition voltage levels in the above embodiment to be progressively higher in the order of recording, reproduction and erasing modes, it is possible to ensure reliable recording operation even when the power supply capacity is reduced while executing reproduction and erasing operations. Thus, it is possible to avoid loosing an important shutter chance and make sufficient use of the features of the electronic camera. Further, while the above embodiment is concerned with an apparatus having three modes, i.e., recording, reproduction and erasing modes, there is no need for providing all these three modes, and the invention is applicable to any apparatus having a plurality of modes. Further, with the above embodiment by permitting the recording, reproduction and erasing inhibition voltages to be set according to the kind of power supply unit, by determining the kind, it is possible to set appropriate inhibition voltage levels depending on power supplies having different capacities and also having different discharge characteristics, thus ensuring operation in each operation mode.

As has been described in the foregoing, according to the invention it is possible to ensure reliable operation in each operation mode and permit effective utilization of power supply.

What is claimed is:

1. A recording or reproduction apparatus for performing an operation in a recording, reproduction or erasing mode with respect to each memory block in a memory means, which comprises:

means for changing a check level for a power supply of the apparatus according to a set one of the recording, reproduction and erasing modes wherein the check level in said reproduction mode is made higher than the check level in said recording mode to enable a later operation in said recording mode; and means for displaying a warning according to said check level while the operation in said reproduction mode is being performed.

2. An apparatus according to claim 1, wherein said power supply is a battery.

3. An apparatus according to claim 1, wherein said power supply is of an AC type.

4. An apparatus according to claim 1, wherein the check level is highest in the erasing mode, next highest in the reproduction mode and lowest in the recording mode.

5. A recording or reproduction method for performing an operation in a recording, reproduction or erasing mode with respect to each memory block, in a memory means, wherein in order to change a check level for a power supply according to the set mode and enable a later operation in the recording mode, the check level in the reproduction mode is made higher than the check level in the recording mode, and a warning display according to the check level is performed while the operation in the reproduction mode is being performed.

6. A method according to claim 5, wherein the power supply is a battery.

7. A method according to claim 5, wherein the power supply is of an AC type.

8. A method according to claim 5, wherein the check level is highest in the erasing mode, next highest in the reproduction mode and lowest in the recording mode.

* * * * *